United States Patent
See et al.

(10) Patent No.: US 12,250,029 B2
(45) Date of Patent: Mar. 11, 2025

(54) SYSTEM AND METHOD FOR RADIO FREQUENCY (RF) SENSING TO DETERMINE DEVICE PARAMETERS

(71) Applicant: QUALCOMM INCORPORATED, San Diego, CA (US)

(72) Inventors: Andrew Puayhoe See, San Diego, CA (US); Sudeepto Roy, Del Mar, CA (US); Ramesh C. N. Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/839,842

(22) Filed: Jun. 14, 2022

(65) Prior Publication Data

US 2023/0403086 A1 Dec. 14, 2023

(51) Int. Cl.
*H04B 17/12* (2015.01)
*H04B 17/309* (2015.01)

(52) U.S. Cl.
CPC .......... *H04B 17/12* (2015.01); *H04B 17/309* (2015.01)

(58) Field of Classification Search
CPC .... H04B 17/12; H04B 17/309; H04B 17/191; H04B 17/297; H04W 52/283; H04W 52/288; G01S 7/417; G01S 13/003; G01S 13/878; G01S 7/412; G01S 13/86; G01S 13/874; G01S 13/88

(Continued)

(56) References Cited

U.S. PATENT DOCUMENTS

| 7,660,573 B2 * | 2/2010 | Elmaleh ................ H04W 16/00 455/406 |
| 2014/0128032 A1 * | 5/2014 | Muthukumar .... H04W 52/0254 455/412.2 |

(Continued)

FOREIGN PATENT DOCUMENTS

| EP | 3472897 B1 | 6/2021 |
| WO | 2012176217 A1 | 12/2012 |
| WO | 2019190914 | 10/2019 |

OTHER PUBLICATIONS

International Search Report and Written Opinion—PCT/US2023/022852—ISA/EPO—Sep. 6, 2023.

*Primary Examiner* — Don N Vo
(74) *Attorney, Agent, or Firm* — Smith Tempel Blaha LLC/Qualcomm Incorporated

(57) ABSTRACT

A device for RF sensing includes communication circuitry configured to communicate over an unlicensed frequency band and a licensed frequency band, the communication circuitry configured to transmit a unique signal over the unlicensed frequency band using at least one antenna of the one or more antennas and receive a corresponding return signal from at least one antenna of the one or more antennas, the at least one receiver configured to process the corresponding return signal to determine at least an amplitude and phase (td) of the corresponding return signal, and a look up table (LUT) having characterization information relating to the amplitude and phase (td) of the corresponding return signal, wherein the device is configured to use the characterization information to determine a use state or a gesture of the device and alter at least one operating parameter of the device based on the determined use state or gesture.

30 Claims, 23 Drawing Sheets

(58) Field of Classification Search
USPC .......................................................... 455/42
See application file for complete search history.

(56) References Cited

U.S. PATENT DOCUMENTS

| | | | |
|---|---|---|---|
| 2016/0037503 A1* | 2/2016 | Wu | H04W 16/14 |
| | | | 370/329 |
| 2018/0054196 A1* | 2/2018 | Yang | H04B 5/72 |
| 2019/0261363 A1* | 8/2019 | Park | H04L 5/0048 |
| 2019/0305859 A1* | 10/2019 | Rimini | G01S 13/86 |
| 2020/0057137 A1* | 2/2020 | Solodky | G01S 13/931 |
| 2021/0025974 A1* | 1/2021 | Vacanti | H03L 7/0991 |

* cited by examiner

Free Space (FS)

Hand Left (HL)

Hand Right (HR)

Beside Head
Hand Left (BHHL)

Beside Head Hand
Right (BHHR)

Coupled Signal (Power)

| Use State | Description | Transmitting Pilot Signal on Ant1 Pinc (dBm) | Ant0 Measured Coupled Signal Power (dBm) | Ant0 Phase (td) Difference from Ant1 (deg) | Ant2 Measured Coupled Signal Power (dBm) | Ant2 Phase (td) Difference from Ant1 (deg) | Ant3 Measured Coupled Signal Power (dBm) | Ant3 Phase (td) Difference from Ant1 (deg) |
|---|---|---|---|---|---|---|---|---|
| US0 | Freespace | -20 | -62.9 | 210.48 | -51.9 | 177 | -35.8 | 85.46 |
| US1 | Hand Left (HL) | -20 | -62.5 | 20.16 | -60.1 | 195.39 | -36.1 | 253.35 |
| US2 | Hand Right (HR) | -20 | -66.1 | 314.36 | -52.1 | 229.72 | -37.3 | 345.45 |
| US3 | Beside Head Hand Left (BHHL) | -20 | -63.1 | 90.1 | -60.3 | 100.1 | -40.1 | 147.51 |
| US4 | Beside Head Hand Right (BHHR) | -20 | -67.1 | 100.1 | -52.3 | 210.1 | -39.1 | 211.1 |

Coupled Signal (Power)

| Use State | Description | Transmitting Pilot Signal on Ant1 Pinc (dBm) | Ant0 Measured Coupled Power (dBm) | Ant0 Phase (td) Difference from Ant1 (deg) | Ant2 Measured Coupled Power (dBm) | Ant2 Phase (td) Difference from Ant1 (deg) | Ant3 Measured Coupled (dBm) | Ant3 Phase (td) Difference from Ant1 |
|---|---|---|---|---|---|---|---|---|
| US0 | Freespace | 10 | -32.9 | 210.48 | -21.9 | 177 | -5.8 | 85.46 |
| US1 | Hand Left (HL) | 10 | -32.5 | 20.16 | -30.1 | 195.39 | -6.1 | 253.35 |
| US2 | Hand Right (HR) | 10 | -36.1 | 314.36 | -22.1 | 229.72 | -7.3 | 345.45 |
| US3 | Beside Head Hand Left (BHHL) | 10 | -33.1 | 90.1 | -30.3 | 100.1 | -10.1 | 147.51 |
| US4 | Beside Head Hand Right (BHHR) | 10 | -37.1 | 100.1 | -22.3 | 210.1 | -9.1 | 211.1 |

FIG. 5C

Table 655:

| Use State | Description | Incident Signal Power (Pinc) on Ant0 (dBm) | Return Signal Power reflected (Pref) from Ant0 (dBm) | Ant0 Phase (td) Difference from Pinc (deg) | Incident Signal Power (Pinc) on Ant1 (dBm) | Return Signal Power reflected (Pref) from Ant1 (dBm) | Ant1 Phase (td) Difference from Pinc (deg) |
|---|---|---|---|---|---|---|---|
| US0 | Freespace | 10 | 0 | 200.48 | 10 | -2 | 125.02 |
| US1 | Hand Left (HL) | 10 | 1.1 | 5.16 | 10 | -1.8 | 233.19 |
| US2 | Hand Right (HR) | 10 | 5.5 | 294.36 | 10 | -2 | 31.09 |
| US3 | Beside Head Hand Left (BHHL) | 10 | 1.5 | 100.1 | 10 | 4 | 57.41 |
| US4 | Beside Head Hand Right (BHHR) | 10 | 5.1 | 90.1 | 10 | 5 | 111 |

Table 675:

| Use State | Description | Incident Signal Power (Pinc) on Ant2 (dBm) | Return Signal Power reflected (Pref) from Ant2 (dBm) | Ant2 Phase (td) Difference from Pinc (deg) | Incident Signal Power (Pinc) on Ant3 (dBm) | Return Signal Power reflected (Pref) from Ant3 (dBm) | Ant3 Phase (td) Difference from Pinc (deg) |
|---|---|---|---|---|---|---|---|
| US0 | Freespace | 10 | 1 | 91.54 | 10 | 2 | 85.46 |
| US1 | Hand Left (HL) | 10 | 4.8 | 57.96 | 10 | 2.5 | 147.51 |
| US2 | Hand Right (HR) | 10 | 1.1 | 115.73 | 10 | 2.5 | 115.73 |
| US3 | Beside Head Hand Left (BHHL) | 10 | 5.1 | 47.41 | 10 | 6 | 253.35 |
| US4 | Beside Head Hand Right (BHHR) | 10 | 2 | 110 | 10 | 6.1 | 211.1 |

FIG. 6C

Free Space (FS)

Hand Left (HL)

Hand Right (HR)

Beside Head Hand Right (BHHR)

Beside Head Hand Left (BHHL)

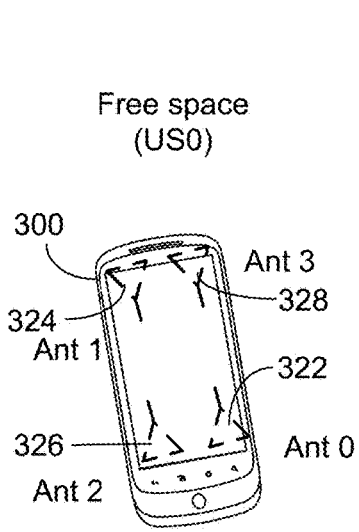
FIG. 10A
Free space (US0)
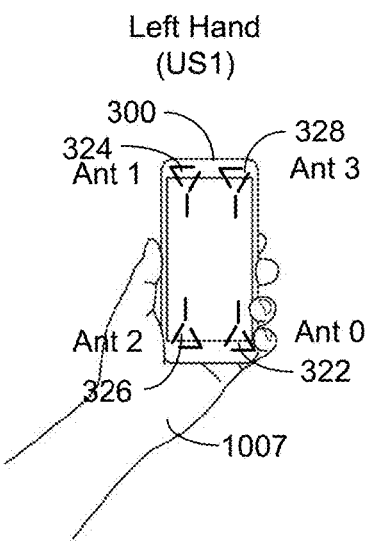
Left Hand next to Ant0 and Ant2
FIG. 10B
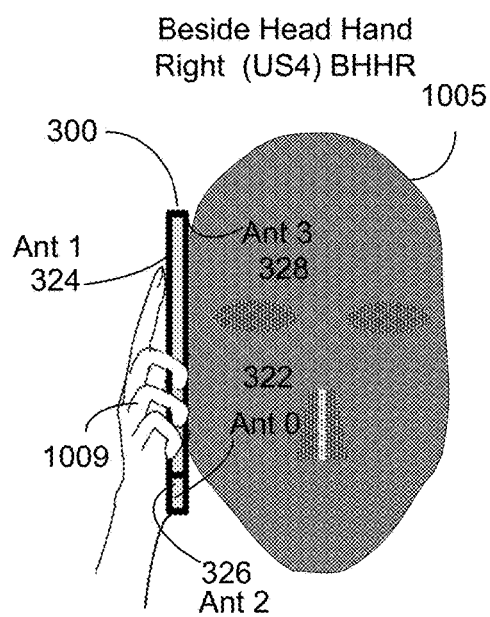
Ant1 and Ant3 Next to Head and Right hand
FIG. 10C
| Use State | Desc | Max Power (dBm) | | | |
|---|---|---|---|---|---|
| | | Ant0 | Ant1 | Ant2 | Ant3 |
| US0 | Free Space | 23 | 23 | 23 | 23 |
| US1 | Left Hand | 21 | 23 | 21 | 23 |
| US2 | Right Hand | 23 | 21 | 23 | 21 |
| US3 | BHHL | 22 | 20 | 21 | 20 |
| US4 | BHHR | 21 | 20 | 22 | 20 |
FIG. 10D

SYSTEM AND METHOD FOR RADIO FREQUENCY (RF) SENSING TO DETERMINE DEVICE PARAMETERS

FIELD

The present disclosure relates generally to electronics, and more specifically to wireless communication systems, and more particularly to wireless communication devices configured to operate in licensed and unlicensed communication spectrum.

BACKGROUND

Wireless communication devices and technologies are becoming ever more prevalent, as are communication devices that operate at 5G NR Sub7 FR1 and millimeter-wave (mmW) FR2 frequencies. Wireless communication devices generally transmit and/or receive communication signals. In a radio frequency (RF) transceiver, a communication signal is typically amplified and transmitted by a transmit section and a received communication signal is amplified and processed by a receive section. A communication device may include multiple transmitters, receivers and antennas and may be capable of communicating on licensed and on unlicensed communication bands and frequencies.

Such communication devices may be configured to communicate via a wireless local-area technology, such as a Bluetooth, a Wi-Fi (IEEE 802.11), or an industrial, scientific or medical network (ISM) network. As governmental authorities generally do not allocate wireless local-area communication frequency bands to specific entities, the frequency bands associated with such technologies are commonly referred to as "unlicensed" communication spectrum, also referred to as unlicensed frequency bands. In contrast, communication spectrum and frequency bands associated with wide-area wireless communication technologies are commonly referred to as "licensed" communication spectrum, or licensed frequency bands, because they are generally allocated to specific entities by governmental authorities.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a device for RF sensing including communication circuitry configured to communicate over an unlicensed frequency band and a licensed frequency band, the communication circuitry having a transmit (Tx) modulator, at least one transmitter, at least one receiver, a receive sensing element, and one or more antennas. The communication circuitry can be configured to transmit a unique signal over the unlicensed frequency band using at least one antenna of the one or more antennas and receive a corresponding return signal from at least one antenna of the one or more antennas, the at least one receiver configured to process the corresponding return signal to determine at least an amplitude and phase (td) of the corresponding return signal, and a look up table (LUT) having characterization information relating to the amplitude and phase (td) of the corresponding return signal, wherein the device is configured to use the characterization information to determine a use state or a gesture of the device and alter at least one operating parameter of the device based on the determined use state or gesture.

Another aspect of the disclosure provides a method for RF sensing to determine device parameters including transmitting from a device a unique signal on an unlicensed frequency band, receiving a return signal at the device responsive to the unique signal, determining an amplitude and phase (td) of the return signal, comparing the determined amplitude and phase (td) of the return signal to a known set of amplitudes and phases corresponding to one or more device characterization profiles, based on the comparing, determining a use state of the device, and based on the determined use state, altering a device parameter of the device.

Another aspect of the disclosure provides a device including means for transmitting a unique signal on an unlicensed frequency band, means for receiving a return signal responsive to the unique signal, means for determining an amplitude and phase (td) of the return signal, means for comparing the determined amplitude and phase (td) of the return signal to a known set of amplitudes and phases corresponding to one or more device characterization profiles, means for determining, based on the comparing, a use state of the device, and means for altering, based on the determined use state, an operating parameter of the device.

Another aspect of the disclosure provides a device including communication circuitry configured to send and receive communications on a licensed frequency band, transmission circuitry configured to send a sensing signal on an unlicensed frequency band while the device is in a call for the licensed frequency band, the transmission circuitry configured to send the sensing signal using a power higher than allowed for the communication circuitry during the call, receive circuitry configured to process a receive signal based on the sensing signal during the call, and a processor configured to adjust an operating parameter of the device based on the processed receive signal.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 4G shows an exemplary device characterization table.

FIG. 5C shows an exemplary device characterization table corresponding to communication device of FIG. 5B.

FIG. 6C shows exemplary device characterization tables.

FIGS. 10A, 10B, 10C and 10D are drawings showing exemplary use states of a communication device and a look up table (LUT) that can be used when characterizing a device.

DETAILED DESCRIPTION

Figure 1:
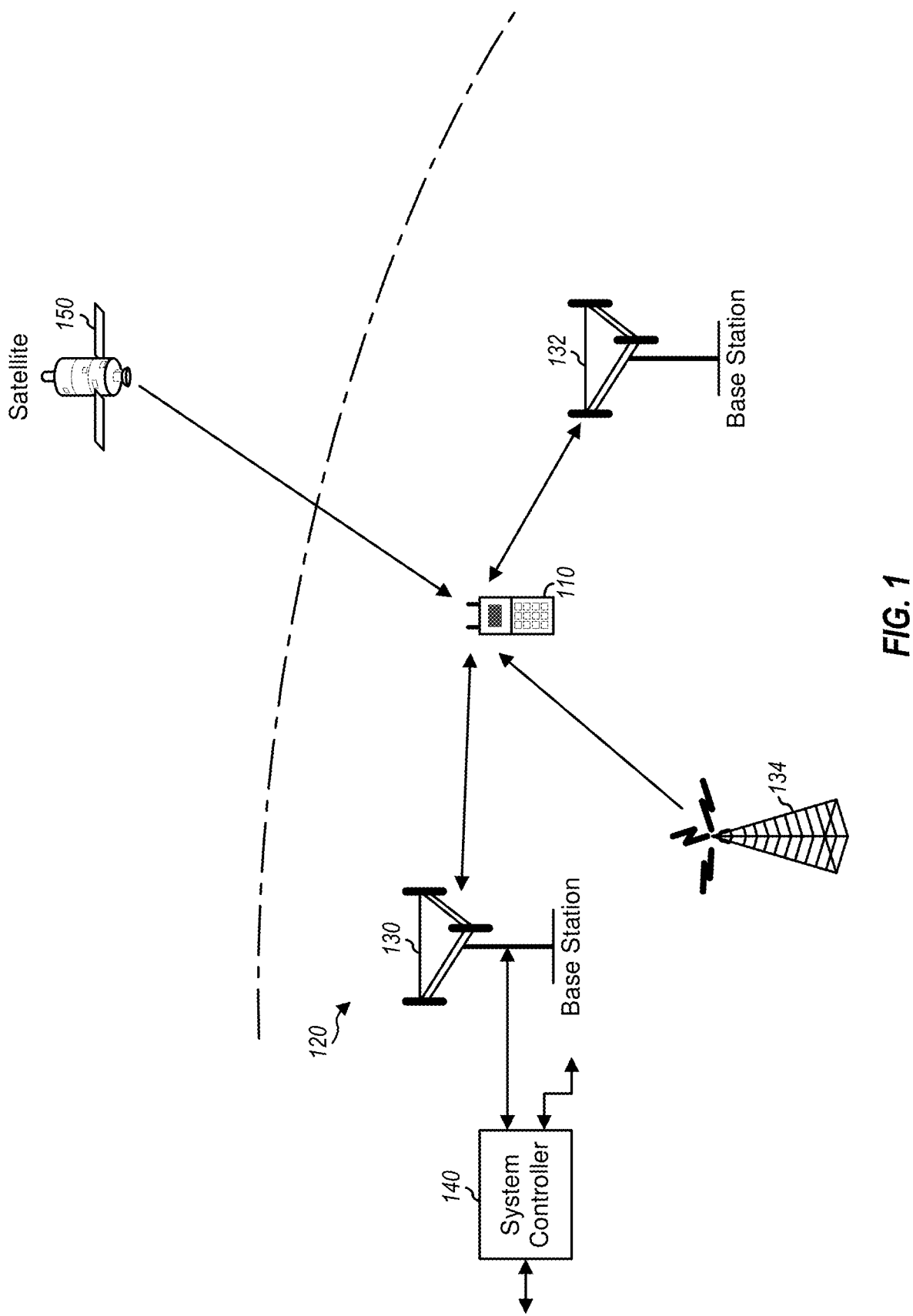
FIG. 1 is a diagram showing a wireless device communicating with a wireless communication system.

The word "exemplary" is used herein to mean "serving as an example, instance, or illustration." Any aspect described herein as "exemplary" is not necessarily to be construed as preferred or advantageous over other aspects.

In a communication device including the capability of being configured for communicating on licensed communication bands and on unlicensed communication bands, it may be desirable to use a portion of the communication circuitry configured for unlicensed bands to perform device characterization and device use-state determination. For example, it may be desirable to use parts of a transmitter configured to operate on an unlicensed communication band and parts of a receiver configured to operate on an unlicensed communication band to perform device characterization and device use-state determination.

In an exemplary embodiment, a transmitter may be configured to transmit a signal, such as a pilot tone, on an unlicensed communication band (e.g., WLAN 2.4 GHz/5 GHz, BT, ISM, and/or 5G NR-U) using one of the available antennas on a communication device. The signal can be coupled from one or more other antennas or reflected from the transmitting antenna (Pinc) on the communication device and then provided to a receiver to analyze the signal. The signal Pinc from the transmitting antenna may also be referred to as an incident signal.

In an exemplary embodiment, a unique return signal (which can be coupled or reflected) that corresponds to the unique transmitted signal can be processed and used to characterize a device state, or a use state, of the device.

In an exemplary embodiment, the amplitude and the phase (td) of the corresponding unique return signal can be used to characterize a device state, or a use state, of the device. The phase (td) is the phase difference between the phase of the return signal (coupled or reflected) and the phase of the signal (incident signal) transmitted by the antenna (Pinc).

In an exemplary embodiment, the information obtained from the corresponding unique return signal can be used to build a look up table (LUT) that can be used to provide device use state characterization.

In an exemplary embodiment, the information in the LUT can also be used as training data for an artificial intelligence (AI) model to detect the use state of the device. Such an AI model then can serve to determine or infer the use state that was characterized.

In an exemplary embodiment, the information in the LUT can be used to determine at least some device parameters of the communication device. Exemplary device parameters include, without limitation, maximum transmit power control, WAN and/or WiFi transmitter parameters, gesture actions, transmit (Tx) antenna selection, antenna tuning, etc.

In an exemplary embodiment, the information in the LUT can be used to determine at least some operating parameters of the licensed communication band circuitry in the communication device.

In an exemplary embodiment, the information obtained from the return signal can be used to determine the position of an object in space or gesture actions.

In an exemplary embodiment, the information obtained from the return signal can also be combined with sensor data (e.g., accelerometer, gyroscope, camera and other sensor data) to further refine and confirm the inferences on the use state determination.

In an exemplary embodiment, the information obtained from the return signal can be used to determine a user state and gesture actions in an application (App) (e.g., an Android App).

In an exemplary embodiment, the information obtained from the return signal can be used to change certain operating parameters of the device.

In an exemplary embodiment, the information obtained from the return signal can be used to change certain parameters of the licensed communication capability of the device.

In an exemplary embodiment, the signal (e.g., pilot) can be transmitted and/or the return signal received while the device is operating (e.g., transmitting and/or receiving) in a licensed communication band. In some examples, circuitry configured for operation with the licensed communication band is separate (e.g., in a distinct circuit or IC or chip or module for a modem, transceiver, and/or front end module) from circuitry configured for operation with the unlicensed communication band.

In an exemplary embodiment, the unlicensed communication band and/or signals sent thereon are defined in a communications standard (e.g., 802.11). In some examples, the unlicensed communication band is not an ISM band. In some examples, the unique transmitted signal is not a frequency modulated continuous wave (FMCW) signal.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS)), etc). Wireless device 110 may support one or more radio technologies for wireless communication such as LTE, WCDMA, CDMA 1×, EVDO, TD-SCDMA, GSM, 802.11, 5G NR FR1 (sub7), FR2 (mmWave), WiFi6, etc. Wireless device 110 may also be a customer premises equipment (CPE), a wireless access point, a hotspot, a mobile WiFi hotspot device, a gaming device such as a handheld game or game controller or a gaming console.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
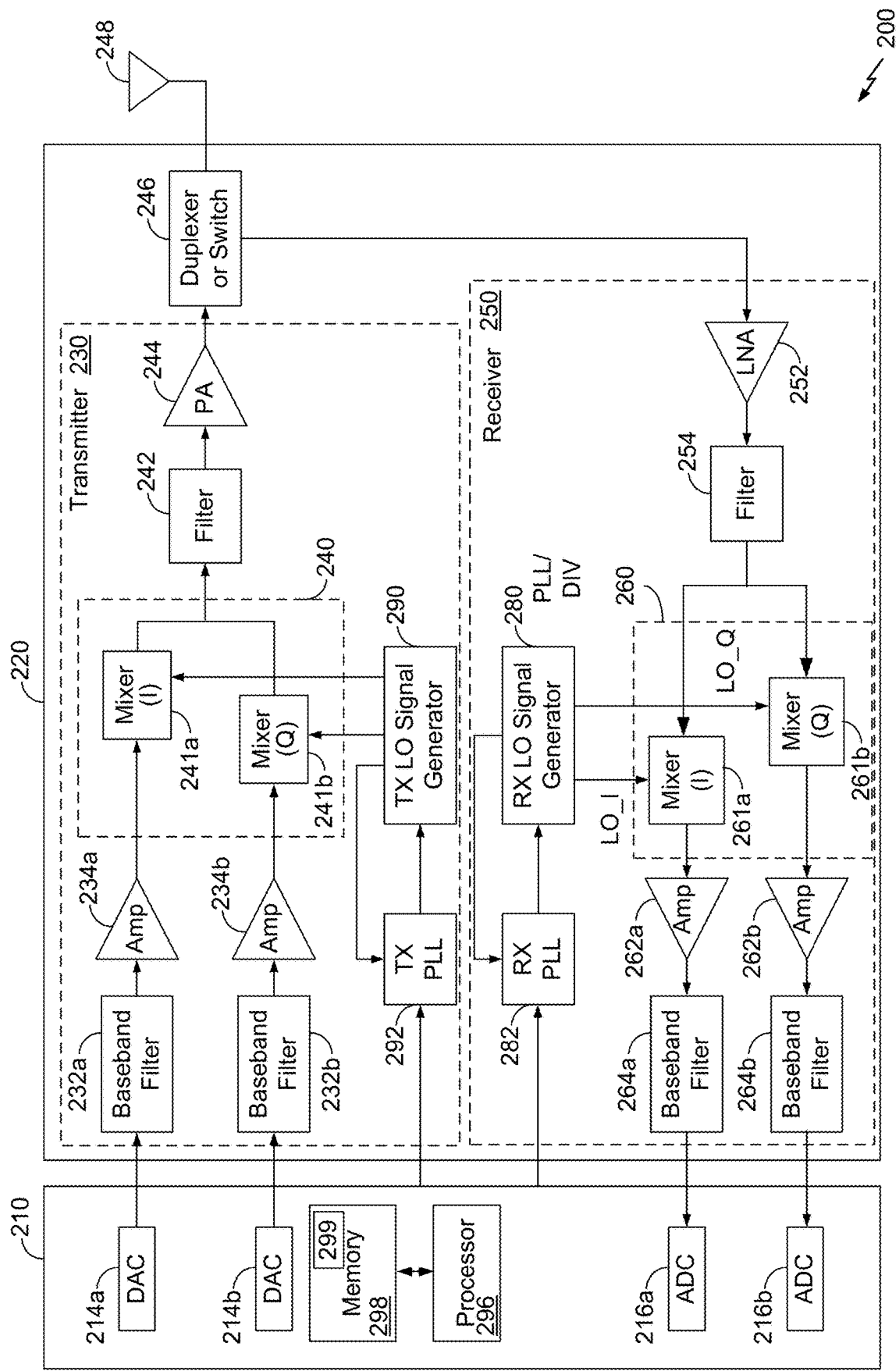
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and/or program codes shown generally using reference numeral 299, and may generally comprise analog and/or digital processing components. The processor 296 and the memory 298 may cooperate to control, configure, program, or otherwise fully or partially control some or all of the operation of the embodiments of the system and method for RF sensing to determine device parameters described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal. Exemplary embodiments of the system and method for RF sensing to determine device parameters may be implemented in or as part of the LNA 252. In other embodiments, the system and method for RF sensing to determine device parameters may be implemented in other portions of the receiver 250, or in a transceiver, such as in a transceiver circuit, module or chip.

Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by baseband (e.g., low-pass) filters 264*a* and 264*b* to obtain I and Q analog input signals, which are provided to data processor 210. In the exemplary embodiment shown, the data processor 210 includes analog-to-digital-converters (ADC's) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation. Wireless device 200 may support WiFi operation (dual or triple band), 5G FR1 NR-U and may support multiple antennas.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
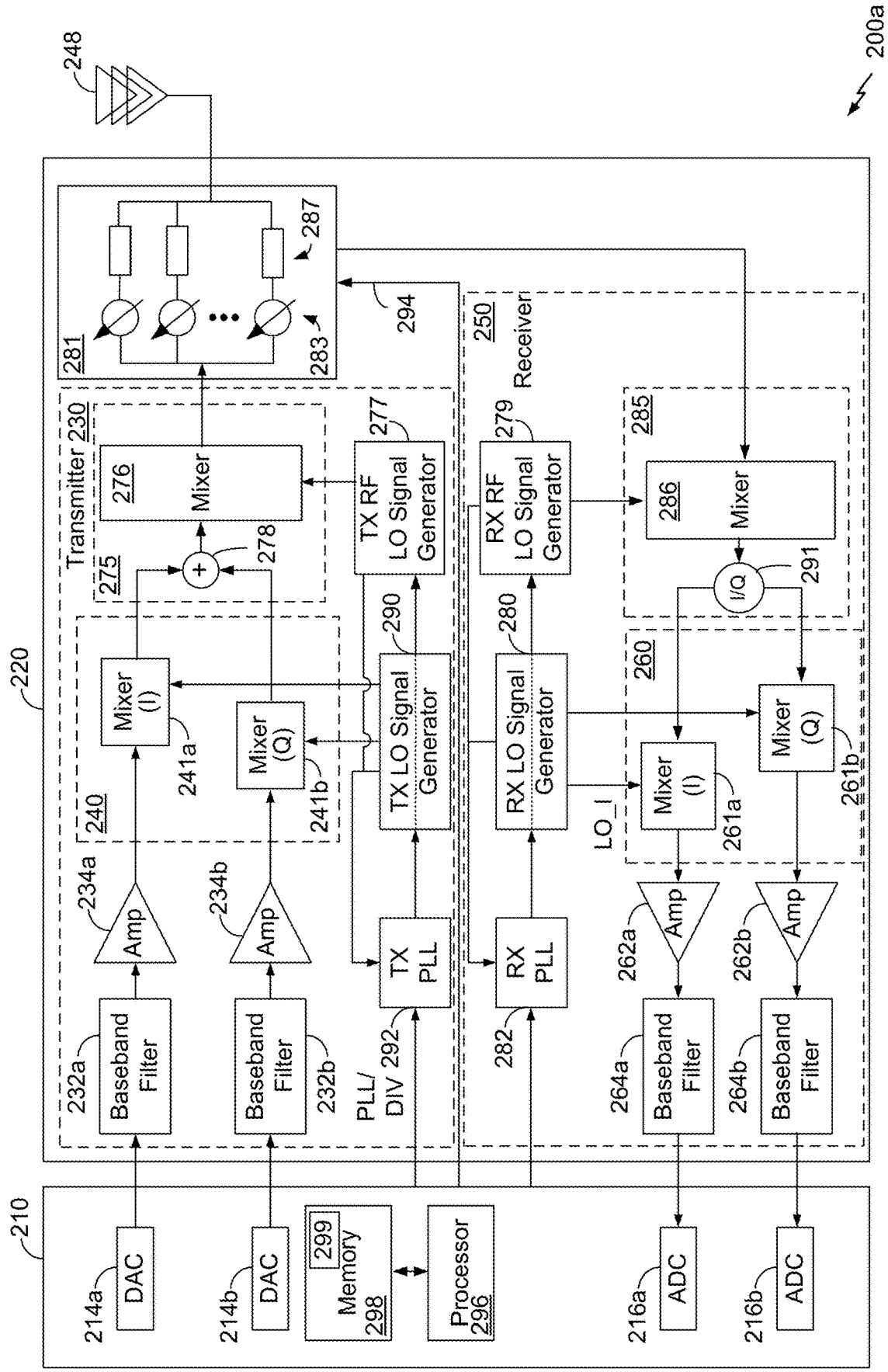
FIG. 2B is a block diagram showing a wireless device in which exemplary techniques of the present disclosure may be implemented.

FIG. 2B is a block diagram showing a wireless device in which exemplary techniques of the present disclosure may be implemented. Certain components, for example which may be indicated by identical reference numerals, of the wireless device 200*a* in FIG. 2B may be configured similarly to those in the wireless device 200 shown in FIG. 2A and the description of identically numbered items in FIG. 2B will not be repeated.

The wireless device 200*a* is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and/or power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B. While certain example frequencies are described herein, other implementations are possible. For example, signals having a frequency above about 20 GHz (e.g., having a mmW frequency) may be transmitted and/or received using a direct conversion architecture. In such embodiments, for example, a phased array may be implemented in the direct conversion architecture.

Figure 3:
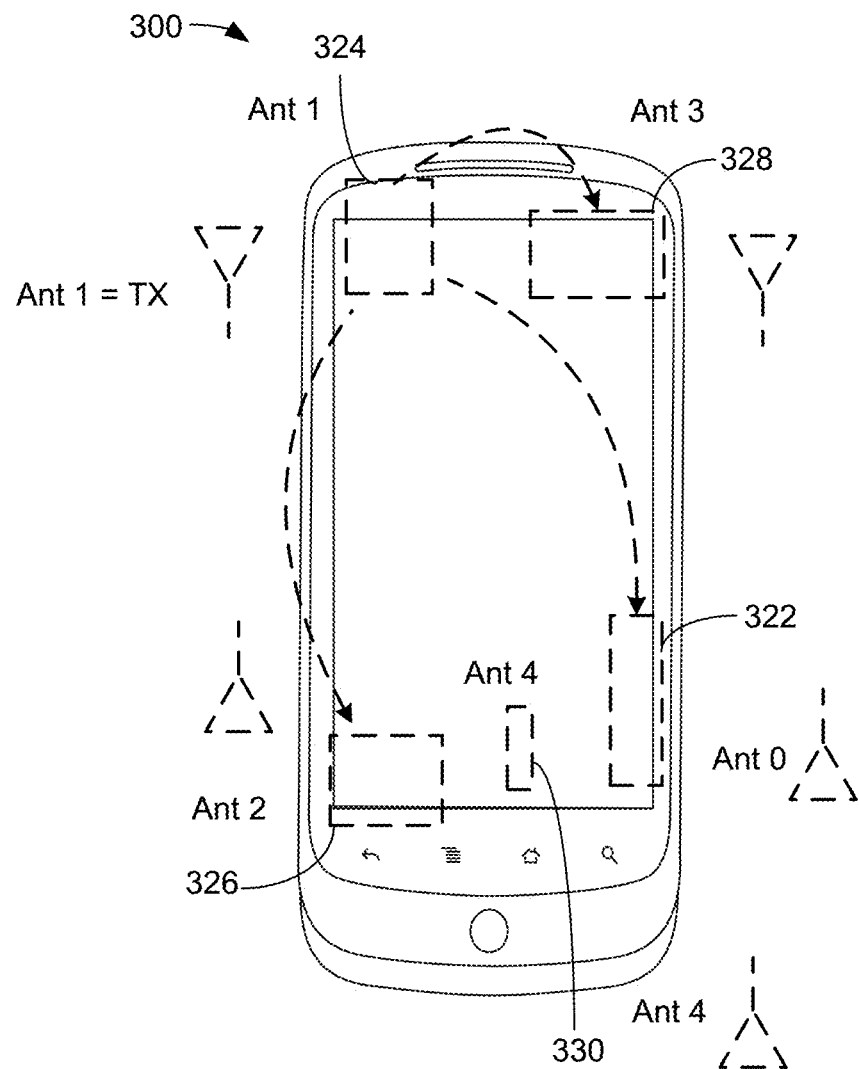
FIG. 3 is a block diagram of a communication device.

FIG. 3 is a block diagram of a communication device 300. The device 300 may be a communication device such as the communications devices described in FIG. 2A and FIG. 2B, or may be another type of device, such as, for example only, a gaming controller or another device. In an exemplary embodiment, the communication device 300 may comprise the capability to operate on a number of different communication bands. In an exemplary embodiment, the communication device 300 may be configured to operate on unlicensed communication bands, such as on WiFi, Bluetooth (BT), or other unlicensed communication bands. In an exemplary embodiment, the communication device 300 may be configured to operate on licensed communication bands, such as on a WAN or other licensed communication bands.

In an exemplary embodiment, the communication device 300 may comprise a number of antennas, such as antennas 322, 324, 326, 328 and 330. In an exemplary embodiment, the antenna 322 may also be referred to as Ant0, the antenna 324 may also be referred to as Ant1, the antenna 326 may also be referred to as Ant2, the antenna 328 may also be referred to as Ant3, and the antenna 330 may also be referred to as Ant4. The antennas 322, 324, 326, 328 and 330 are shown in dotted line and in different shapes to illustrate the example that the antennas may be located in different locations within the communication device 300, and may have different shapes and configurations. The dotted lines extending from antenna 324 (Ant1) to antennas 328 (Ant3), 322 (Ant0) and 326 (Ant2) illustrate exemplary signal coupling that may occur in an embodiment where antenna 324 (Ant1) may be used to transmit a unique signal (such as a pilot signal). The unique signal may couple to one or more of the other antennas and be received as a return signal. In some embodiments, the antenna 330 (Ant4) is optional and may not be present in the communication device. Further, although five exemplary antennas are illustrated in FIG. 3, a communication device may have more or fewer antennas.

Figure 4A:
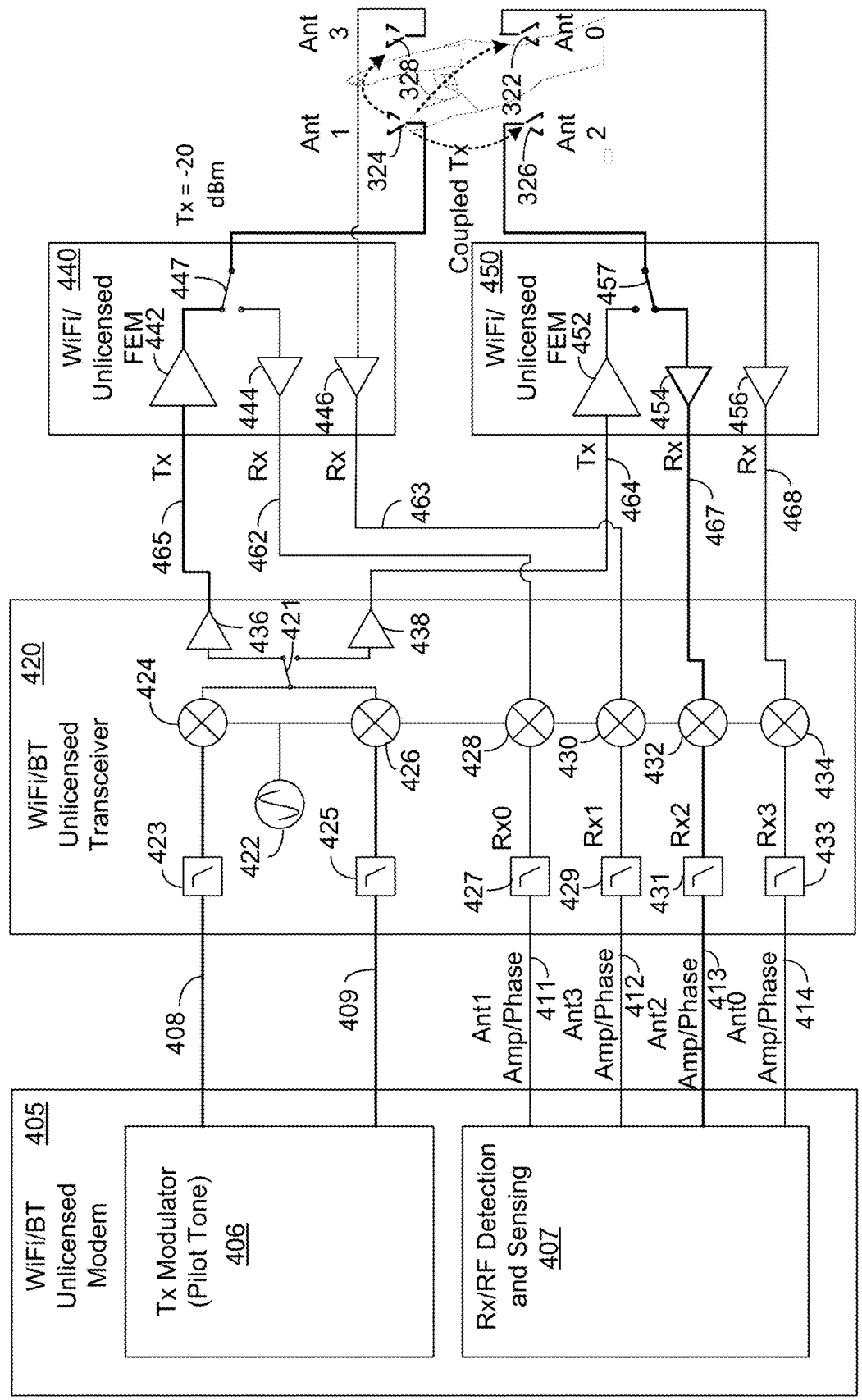
FIG. 4A is a block diagram showing an exemplary embodiment of a portion of a communication device configured for unlicensed communication.

FIG. 4A is a block diagram showing an exemplary embodiment of a portion of a communication device 400 configured for unlicensed communication. In an exemplary embodiment, the communication device 400 may comprise a modem 405, a transceiver 420 a front end module (FEM) 440 and a FEM 450. In an exemplary embodiment, the modem 405, the transceiver 420, the FEM 440 and a FEM 450 may be configured to operate on unlicensed frequency bands, such as those frequency bands associated with WiFi, Bluetooth (BT), or other unlicensed frequency bands. Other unlicensed frequency bands may include, without limitation, 5 GHz WiFi, 5G New Radio-Unlicensed (5G NR-U), and ISM bands among other unlicensed frequency bands. Although not shown in FIG. 4A, the communication device 400 may also include circuitry configured to allow communication on licensed frequency bands, such as, for example, frequency bands that allow operation on cellular, WAN, Long Term Evolution (LTE) systems, a Code Division Multiple Access (CDMA) systems, a Global System for Mobile Communications (GSM) system, a wireless local area network (WLAN) system, a 5G NR (new radio) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. A 5G system may include systems that allow beamforming, simultaneous communication on multiple frequency bands, and other systems. The circuitry configured to allow communication on licensed frequency bands may be separate from the circuitry illustrated in FIG. 4A (e.g., in a distinct circuit or IC or chip or module), or one or more components illustrated in FIG. 4A may be shared or configured for communication in both unlicensed and licensed frequency bands. For example, the modem and/or the transceiver may be configured for operation in both unlicensed and licensed frequency bands, or circuitry for communicating in both unlicensed and licensed frequency bands may be included in a common System on Chip (SoC).

In some embodiments, the device 400 may not be a communication device, but may be another device, such as, for example only, a gaming controller. A gaming controller may have circuitry configured to allow communication over unlicensed frequency bands, such as WiFi, Bluetooth, etc., and may also have a data processor (such as the data processor 210) configured to run applications, referred to as "apps."

In such embodiments, the circuitry configured for communication over one or more unlicensed bands (which may be referred to as unlicensed communication circuitry in) the device 400 may be configured to be used for device characterization as directed by an application. For example, the program code 299 (FIG. 2A) may include application code that may be executed to allow the device 400 to operate as a gaming controller, or another device, and perform gesture sensing. In some embodiments, the application may include features or operations that may be adjusted, controlled, or otherwise modified based on the device characterization described herein. In other examples, application code may be stored and/or executed from another processor (not illustrated), for example an apps processor.

In an exemplary embodiment, the modem 405 may comprise a transmit (Tx) modulator 406 and a receive (Rx)/Radio Frequency (RF) detection and sensing element 407. In an exemplary embodiment, the Tx modulator 406 may be configured to generate a test signal, such as a pilot tone, or another signal having a unique code. In some embodiments, the modem 405 is implemented by the data processor 210.

In an exemplary embodiment, the transceiver 420 may comprise a local oscillator (LO) signal generator 422, a transmit filter 423, a transmit filter 425, a transmit mixer 424, a transmit mixer 426, a switch 421, a driver amplifier 436 and a driver amplifier 438. The LO signal generator 422, transmit filter 423, transmit filter 425, transmit mixer 424, transmit mixer 426, driver amplifier 436 and driver amplifier 438 may be similar to the TX LO signal generator 290, baseband (e.g., lowpass) filters 232a and 232b, amplifiers 234a and 234b, and upconversion mixers 241a and 241b of FIG. 2A, and may be configured for operation on unlicensed frequency bands.

In an exemplary embodiment, the transceiver 420 may comprise receive filters 427, 429, 431 and 433, and may comprise receive mixers 428, 430, 432 and 434.

The receive filters 427, 429, 431 and 433 may be similar to the baseband (e.g., lowpass) filters 264a and 264b of FIG. 2A. The receive mixers 428, 430, 432 and 434 may be similar to the downconversion mixers 261a and 261b of FIG. 2A, and may be configured for operation on unlicensed frequency bands.

In an exemplary embodiment, the FEM 440 may comprise a switch 447, a transmit amplifier 442 and receive amplifiers 444 and 446. The transmit amplifier 442 may comprise one or more driver stages and power amplifier stages, and may be similar to the PA 244 of FIG. 2A, and may be configured for operation on unlicensed frequency bands. The receive amplifiers 444 and 446 may each comprise a low noise amplifier (LNA) and may be similar to the LNA 252 of FIG. 2A and may be configured for operation on unlicensed frequency bands.

In an exemplary embodiment, the FEM 450 may comprise a switch 457, a transmit amplifier 452 and receive amplifiers 454 and 456. The transmit amplifier 452 may comprise one or more driver stages and power amplifier stages, and may be similar to the PA 244 of FIG. 2A, and may be configured for operation on unlicensed frequency bands. The receive amplifiers 454 and 456 may each comprise a low noise amplifier (LNA) and may be similar to the LNA 252 of FIG. 2A and may be configured for operation on unlicensed frequency bands.

In an exemplary embodiment, the switch 447 is configured to selectively connect the transmit amplifier 442 to the antenna 324 (Ant1) in this example. The LNA 446 is connected to the antenna 328 (Ant3) in this example. In an exemplary embodiment, the switch 457 is configured to selectively connect the LNA 454 to the antenna 326 (Ant2) in this example, and the LNA 456 is connected to the antenna 322 (Ant0) in this example.

In accordance with an exemplary embodiment, the Tx modulator 406 is configured to provide a signal having unique characteristics (such as a pilot tone, which may be defined by a standard for unlicensed communications, or may be defined otherwise) over connection 408 to the transmit filter 423 and to the transmit mixer 424 and over connection 409 to the transmit filter 425 and to the transmit mixer 426. The output of the transmit mixer 424 and the output of the transmit mixer 426 are summed together and provided through the switch 421 to the driver amplifier 436 or to the driver amplifier 438 in this example, but other examples in which a single (non-summed or -combined) signal is selectively routed to either the driver amplifier 436 or to the driver amplifier 438. In this exemplary embodiment, the summed output of the mixers 424 and 426 are provided to the driver amplifier 436 and over connection 465 to the transmit amplifier 442. In this manner, a unique signal may be transmitted via the antenna 324 (Ant1), in this example.

In an exemplary embodiment shown in FIG. 4A, the unique signal transmitted via antenna 324 may couple (or otherwise appear as signal energy) at the antenna 322 (Ant0), antenna 326 (Ant2) and/or the antenna 328 (Ant3). In an exemplary embodiment, the coupling of the signal energy from one antenna to another may occur via a mechanism known as mutual coupling. By virtue of the signal energy coupling from a transmit antenna to a receive antenna, a receive signal will appear at the LNA 446 (connected to antenna 328 (Ant3)), a receive signal will appear at the LNA 454 (connected to antenna 326 (Ant2)) and a receive signal will appear at the LNA 456 (connected to antenna 322 (Ant0)). The receive signals appearing at the LNA 446, LNA 454 and the LNA 456 may be referred to as a return signal in some embodiments.

In an exemplary embodiment, the LNA 446 is connected to the receive mixer 430 over connection 463, the LNA 454 is connected to the receive mixer 432 over connection 467, and the LNA 456 is connected to the receive mixer 434 over connection 468.

In this example, because the switch 447 connects the transmit amplifier 442 to the antenna 324 (Ant1) so that the antenna 324 (Ant1) can be used as a transmit antenna in this example, the LNA 444 does not receive any return signal energy.

In this exemplary embodiment, the receive mixers 428, 430, 432 and 434 may receive a receive LO signal from the LO signal generator 422.

In this exemplary embodiment, the receive mixer 428 is connected to the receive filter 427, the receive mixer 430 is connected to the receive filter 429, the receive mixer 432 is connected to the receive filter 431 and the receive mixer 434 is connected to the receive filter 433.

In this exemplary embodiment, the receive filters 427, 429, 431 and 433 are connected to the Rx/RF detection and sensing element 407 over respective connections 411, 412, 413 and 414. The LNAs 444, 446, 454, 456 may further be coupled to an Rx demodulator (e.g., in the modem 405, not illustrated) configured to demodulate data communication signals received over the unlicensed bands, either through mixers 428, 430, 432, and/or 434 and/or receive filters 427, 429, 431 and 433, or through other circuitry. Other LNAs (not illustrated) may also be implemented in the device 400 and configured to receive data communication signals received over the unlicensed bands.

In this example where signal energy is received by the LNAs 446, 454 and 456, the amplitude and phase (td) provided by the receive filter 429 on connection 412 corresponds to the return signal received at the antenna 328 (Ant3), the amplitude and phase (td) provided by the receive filter 431 on connection 413 corresponds to the return signal received at the antenna 326 (Ant2), and the amplitude and phase (td) provided by the receive filter 433 on connection 414 corresponds to the return signal received at the antenna 322 (Ant0). The phase (td) is the phase difference between the phase of the return signal (Pcoupled) and the phase of the unique signal transmitted by the transmitting antenna (Pinc).

In an exemplary embodiment, one or more of the signals on connections 412, 413 and 414 in this example can be used to characterize the device 400 and to determine a use state of the device 400 after characterization. For example, based on the amplitude and phase (td) of each of the signals on connections 412, 413 and 414 in this example, (provided by the antennas 322 (Ant0), 326 (Ant2) and 328 (Ant3)) the communication device may be characterized, which can, for example, be used to determine whether one or more of the antennas are blocked. The phase (td) is the phase difference between the phase of the return signal (Pcoupled) and the phase of the signal transmitted by the transmitting antenna (Pinc). A blocked antenna may be used to determine how the device is being held (right hand, left hand, beside head, etc.). This information can be used to build a lookup table (or other mechanism) that can characterize various use states of the device, and can be used to determine a device use state. Additional characterization information can be added to the lookup table by transmitting the unique signal via a different antenna, such as antenna 326 (Ant 2) and measuring the return signal (Pcoupled) at the antenna 322 (Ant0), antenna 324 (Ant1) and the antenna 328 (Ant3). Knowing the use state allows altering a behavior of the device based on the detected use state. For example, the maximum allowable transmitted power from a given antenna (e.g., for RF exposure purposes) may be altered based on a detected use state of the device 400. In another example, the information obtained from the signals related to the antennas 322 (Ant0), 326 (Ant2) and 328 (Ant3) can be used to determine the position of an object in space or to determine gesture actions for example, for use when the device 400 is used as a gaming controller.

In an exemplary embodiment, the unlicensed communication circuitry in the device 400 may not be subject to the same constraints as licensed communication circuitry that may also be present in the device 400. For example, the unlicensed communication circuitry in the device 400 may not have specific timing or power requirements (or may have less stringent power requirements) that may dictate transmission time or transmission power. In this manner, unlicensed communication circuitry in the device 400 is suitable for device characterization. In some examples, device state detection may be performed more often or at more opportune times, and/or increased transmit power of the unique transmit signal may allow for greater resolution or distance at which objects or gestures may be detected, as compared to operation of known devices. In some examples, device state detection as described herein may be performed with a (unique) signal that has a reduced complexity (with respect to the signal itself and/or hardware required to send and/or receive it) as compared to an FMCW signal. In some examples, the unique signal is not transmitted or received in an ISM band.

In an exemplary embodiment, a unique signal, such as a pilot tone having an exemplary power of −20 dBm, may be transmitted via the antenna 324 (Ant1). The signal energy transmitted by the antenna 324 (Ant1) may be coupled to the antennas 322 (Ant0), antenna 326 (Ant2) and antenna 328 (Ant3). In an alternative exemplary embodiment, a unique signal, such as a pilot tone having an exemplary power of −20 dBm, may be transmitted via the antenna 324 (Ant1) for a short duration and thereafter the switch 447 may be switched to receive a return signal reflected from an object or gesture action on antenna 324 (Ant1). Furthermore, a return signal reflected from an object or gesture actions can be measured on antenna 322 (Ant0), antenna 326 (Ant2) and antenna 328 (Ant3).

The amplitude and phase (td) information received by the antennas can be used for device characterization, use state determination, gesture detection, and other device parameters. In an exemplary embodiment, a time difference between the incident signal (Pinc) and reflected signal can be used to estimate the distance of an object from the antenna and/or gesture actions. The phase (td) is the phase difference between the phase of the return signal (Pcoupled) and the phase of the signal transmitted by the transmitting antenna (Pinc). In an exemplary embodiment, the reflected signal may be from an antenna, or from a body or object and may be caused by a gesture.

FIGS. 4B, 4C, 4D, 4E, and 4F are drawings showing exemplary use states of a communication device. The exemplary use states shown in FIGS. 4B, 4C, 4D, 4E, and 4F may be determined in accordance with the system and method for RF sensing described herein. Reference will be made to device 300 below, but such description applies equally to device 400.

Figure 4B:
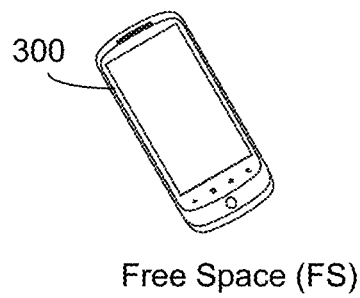
FIGS. 4B, 4C, 4D, 4E, and 4F are drawings showing exemplary use states of a communication device.

FIG. 4B shows an exemplary free space use state, where the communication device 300 is determined to be located in free space.

Figure 4C:
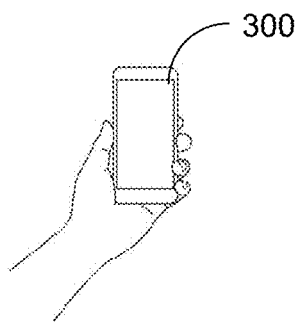

FIG. 4C shows an exemplary hand left (HL) use state, where the communication device 300 is determined to be located in a user's left hand.

Figure 4D:
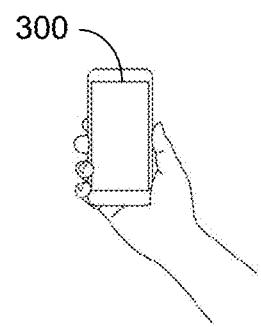

FIG. 4D shows an exemplary hand right (HR) use state, where the communication device 300 is determined to be located in a user's right hand.

Figure 4E:
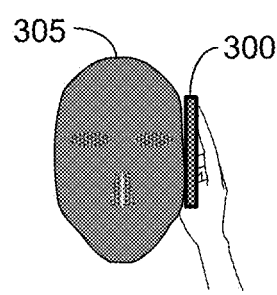

FIG. 4E shows an exemplary beside head hand left (BHHL) use state, where the communication device 300 is determined to be located in a user's left hand and beside a left side of the head of the user 305.

Figure 4F:
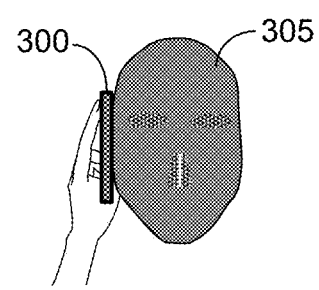

FIG. 4F shows an exemplary beside head hand right (BHHR) use state, where the communication device 300 is determined to be located in a user's right hand and beside a right side of the head of the user 305.

Use states other than those illustrated in FIGS. 4B-4F may be determined in addition or instead. For example, a use state in which a user is holding either end of the device 300 (e.g., in a gaming mode) or in which two users are each holding a respective end of the device 300 may be determined. As another example, a use state in which the device 300 is disposed next to a head of the user 305 without being near any of the user's hands (e.g., when the device is strapped to a front of the head for use in VR configurations) may be determined. Other examples are possible.

FIG. 4G shows an exemplary device characterization table 455. In an exemplary embodiment, one or more characterization tables can be developed as part of a device characterization training operation. For example, the device characterization table 455 may include amplitude and phase (td) information for one or more antennas. The phase (td) is the phase difference between the phase of the return signal (Pcoupled) and the phase of the unique signal transmitted by the transmitting antenna (Pinc). In the example shown in FIG. 4G, device characterization table 455 shows use states US0 (free space), US1 (hand left), US2 (hand right), US3 beside head hand left) and US4 (beside head hand right), that correspond to the use states shown in FIGS. 4B, 4C, 4D, 4E and 4F, respectively. In an exemplary embodiment, the device characterization table 455 shows that antenna 324 (Ant1) transmits a unique signal (e.g., a pilot signal) at a power of −20 dBm. The device characterization table 455 also shows an amplitude (power measured in dBm) and a phase (in degrees relative to antenna 324 (Ant1 in this example), for each of antennas 322 (Ant0), 326 (Ant2) and 328 (Ant1), for each use state US0, US1, US2, US3 and US4. In this manner, an amplitude and phase (td) can be developed for each use state. The phase (td) is the phase difference between the phase of the return signal (Pcoupled) and the phase of the signal transmitted by the transmitting antenna (Pinc). One or more device characterization tables can be developed and stored in a memory, such as the memory 298 in FIG. 2A. Further, determination of use state may depend on power values from a single receive antenna in some examples, or may be based on values obtained from several receive antennas (e.g., based on transmissions from one antenna or multiple).

Figure 4H:
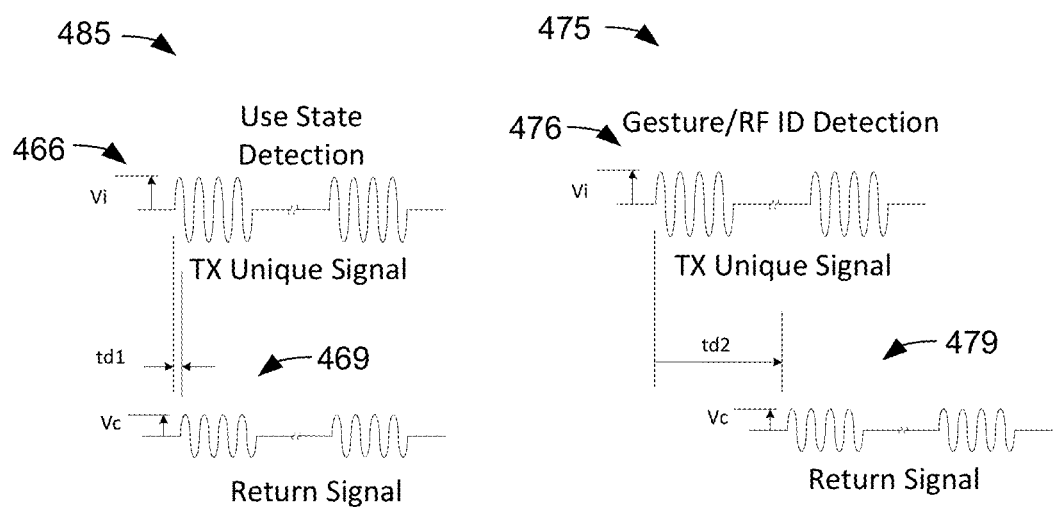
FIG. 4H shows exemplary use state and gesture/RF detection signals.

FIG. 4H shows exemplary use state and gesture/RF detection signals. In an exemplary embodiment, the use state 485 shows a transmit signal 466 (also referred to as a TX unique (incident) signal (Pinc)), and a return signal 469 (also referred to in this example as a coupled signal); however, the return signal 469 may also be a reflected signal as described herein. In an exemplary embodiment, the phase (td1) or timing delay between the transmit signal 466 and the return signal 469 may be used to determine a use state of a device. The phase (td1) is the phase difference between the return signal (Pcoupled) and the signal transmitted by the transmitting antenna (Pinc). This may be used for detecting use state, body or object near the antennas/phone (e.g. distance <=4 cm).

In an exemplary embodiment, the use state 475 shows a transmit signal 476 (also referred to as a TX unique (incident) signal (Pinc)), and a return signal 479 (also referred to in this example as a coupled signal); however, the return signal 479 may also be a reflected signal as described herein. In an exemplary embodiment, the phase (td2) or timing delay, between the transmit signal 476 and the return signal 479 may be used to determine a gesture or an RF state of the device. The phase (td2) is the phase difference between the return signal (Pcoupled) and the phase of the signal transmitted by the transmitting antenna (Pinc). This may be for detecting gesture or object further away antennas/phone (e.g., a distance >approximately 4 cm). As can be seen in FIG. 4H, the transmit signal 466 and/or 476 may be a signal other than an FMCW signal.

Figure 5A:
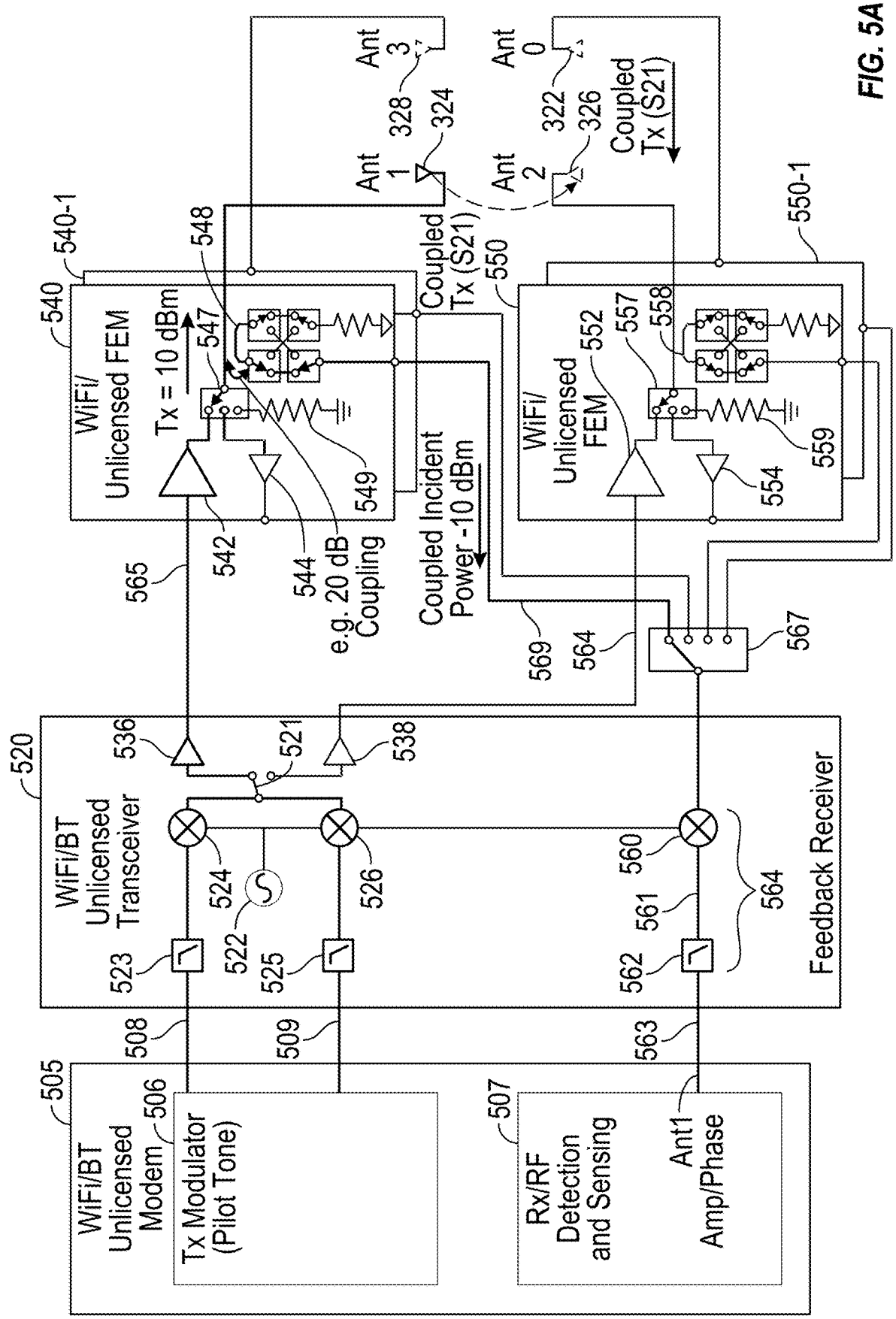
FIG. 5A is a block diagram showing an exemplary embodiment of a portion of a communication device configured for unlicensed communication.
Figure 5B:
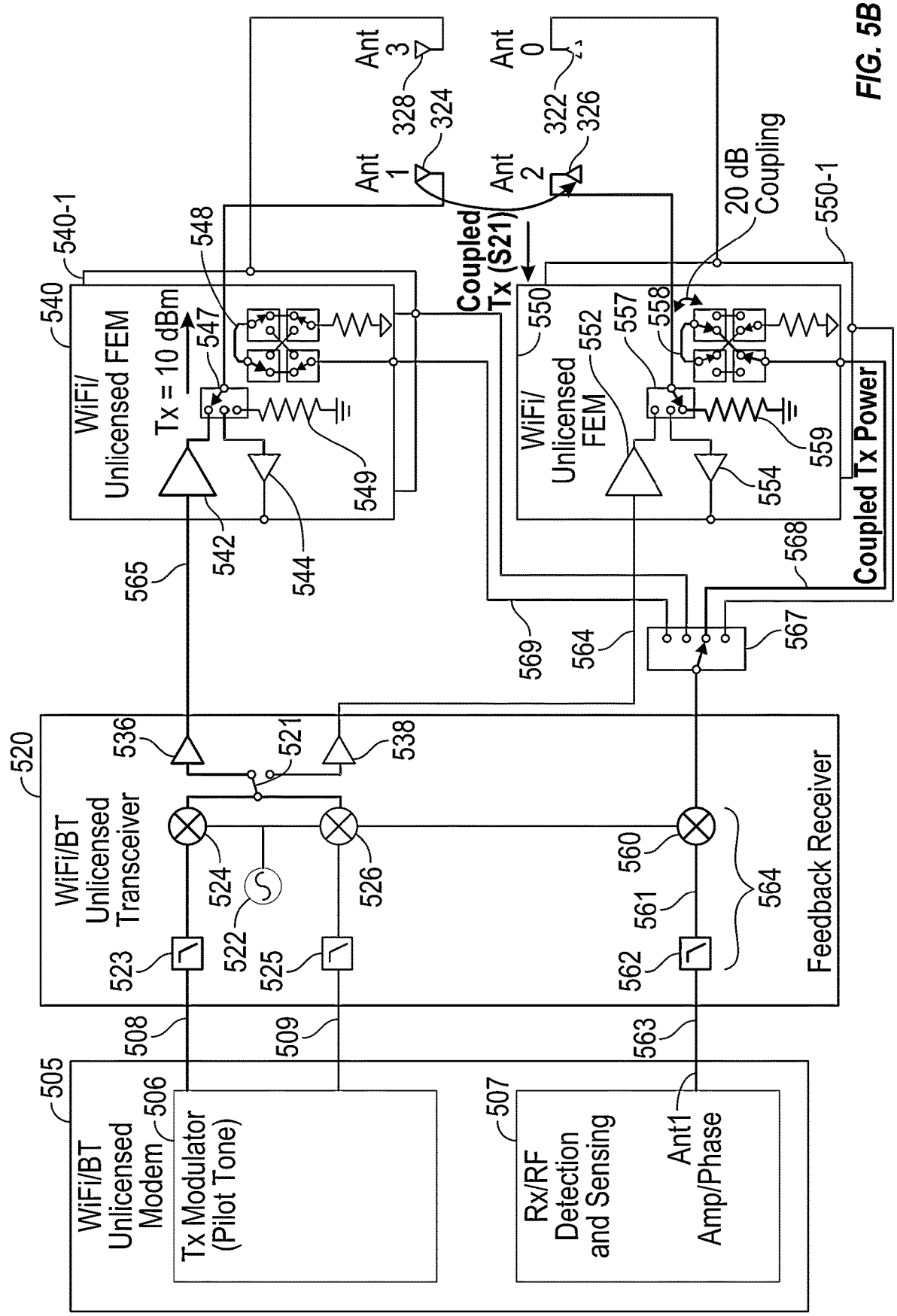
FIG. 5B is a block diagram showing an exemplary embodiment of a portion of a communication device configured for unlicensed communication.

FIGS. 5A and 5B are block diagrams showing exemplary embodiments of a portion of a communication device 500 configured for unlicensed communication. The portion of the communication device 500 shown in FIGS. 5A and 5B is similar to the portion 400 of the communication device shown in FIG. 4A except with respect to aspects described otherwise below. Elements in FIGS. 5A and 5B that are similar to elements in FIG. 4A will be numbered using the notation 5XX, where an element labeled 5XX in FIGS. 5A and 5B is similar to an element labeled 4XX in FIG. 4A. The configuration of the communication device 500 shown in FIG. 5A may be used when measuring the incident power and phase of a coupled incident return signal from a power amplifier. The configuration of the communication device 500 shown in FIG. may be used when measuring the power and phase of a return signal coupled from one antenna to another antenna.

In an exemplary embodiment, the communication device 500 may comprise a modem 505, a transceiver 520 a front end module (FEM) 540 and a FEM 550. In an exemplary embodiment, the modem 505, the transceiver 520, the FEM 540 and a FEM 550 may be configured to operate on unlicensed frequency bands, such as those frequency bands associated with WiFi, Bluetooth (BT), or other unlicensed frequency bands. Other unlicensed frequency bands may include, without limitation, 5 GHz WiFi and 5G New Radio-Unlicensed (5G NR-U), among other unlicensed frequency bands. In an exemplary embodiment, the modem 505 may comprise a transmit (Tx) modulator 506 and a receive (Rx)/Radio Frequency (RF) detection and sensing element 507. In an exemplary embodiment, the Tx modulator 506 may be configured to generate a test signal, such as a pilot tone, or another signal having a unique code or other unique characteristics.

In an exemplary embodiment, the transceiver 520 may comprise a local oscillator (LO) signal generator 522, a transmit filter 523, a transmit filter 525, a transmit mixer 524, a transmit mixer 526, a switch 521, a driver amplifier 536 and a driver amplifier 538. The LO signal generator 522, transmit filter 523, transmit filter 525, transmit mixer 524, transmit mixer 526, switch 521, driver amplifier 536 and driver amplifier 538 may be similar to the TX LO signal generator 290, baseband (e.g., lowpass) filters 232a and 232b, amplifiers 234a and 234b, and upconversion mixers 241a and 241b of FIG. 2A.

In an exemplary embodiment, the transceiver 520 may comprise receive filter 562 and receive mixer 560. In an exemplary embodiment, the receive filter 562 and the receive mixer 560 may be, or may form part of what is referred to as a feedback receiver 564. A feedback receiver is typically used for Tx power control, antenna impedance/coupling measurement, antenna tuning, predistortion and etc. In an exemplary embodiment, the feedback receiver 564 is used for use state and gesture detection. In an exemplary embodiment, the receiver mixer 560 may receive the LO signal from the Tx LO signal generator 522. In an exemplary embodiment, a switch 567 may be configured to connect the receive mixer 560 to a selected one of the FEM 540, FEM 540-1, FEM 550 and FEM 550-1. In this example, the switch 567 is shown as a four position switch, but the capability of the switch 567 can be designed based on the number of FEMs and/or antennas coupled thereto.

In an exemplary embodiment, the FEM 540 may comprise a switch 547, a directional coupler 548, a transmit amplifier 542 and a receive amplifier 544. Multiple instances of the FEM 540 may be implemented with FEM 540-1 shown for reference. The transmit amplifier 542 may comprise one or more driver stages and power amplifier stages, and may be similar to the PA 244 of FIG. 2A. The receive amplifier 544 may comprise a low noise amplifier (LNA) and may be similar to the LNA 252 of FIG. 2A. In an exemplary embodiment, the switch 547 may be a three-position switch configured to select among the transmit amplifier 542, the LNA 544 and system ground through a termination load (e.g., 50 ohms) 549. In an exemplary embodiment (FIG. 5A), the directional coupler 548 is configured to couple the transmit signal power (Pinc) to the feedback receiver 564 via internal switches in the coupler 548 when the switch 547 selects the power amplifier 542. This measured Pinc (signal amplitude and phase) is used as a reference with which to compare the return signal.

In an exemplary embodiment, the FEM 550 may comprise a switch 557, a directional coupler 558, a transmit amplifier 552 and a receive amplifier 554. Multiple instances of the FEM 550 may be implemented with FEM 550-1 shown for reference. The transmit amplifier 552 may comprise one or more driver stages and power amplifier stages, and may be similar to the PA 244 of FIG. 2A. The receive amplifier 554 may comprise a low noise amplifier (LNA) and may be similar to the LNA 252 of FIG. 2A. In an exemplary embodiment, the switch 557 may be a three-position switch configured to select among the transmit amplifier 552, the LNA 554 and system ground through a termination load (e.g., 50 ohms) 559. In an exemplary embodiment, the directional coupler 558 is configured to couple a portion of the signal (via internal switches in the directional coupler 558) traveling between the switch 557 and the antenna 326 (Ant2) when the switch 557 is set to system ground via the termination load (e.g., 50 ohms) 559.

In an exemplary embodiment, the switch 547 may be configured to connect the transmit amplifier 542 to the antenna 324 (Ant1) in this example. The LNA 544 remains unconnected in this example.

In this example, circuitry on the FEM 540-1 may be connected to the antenna 328 (Ant3) and circuitry on the FEM 550-1 may be connected to the antenna 322 (Ant0) in this example.

In accordance with an exemplary embodiment, the Tx modulator 506 is configured to provide a unique signal (such as a pilot tone) over connection 508 to the transmit filter 523 and to the transmit mixer 524 and over connection 509 to the transmit filter 525 and to the transmit mixer 526. The output of the transmit mixer 524 and the output of the transmit mixer 526 are summed together and provided through the switch 521 to the driver amplifier 536 or to the driver amplifier 538. In this exemplary embodiment, the summed output of the mixers 524 and 526 are provided to the driver amplifier 536 and over on connection 565 to the transmit amplifier 542. In this manner, the unique signal may be transmitted via the antenna 324 (Ant1), in this example.

In an exemplary embodiment, the directional coupler 558 is connected to the receive mixer 560 over connection 568 and the receive mixer 560 is connected to the receive filter 562 over connection 561.

In this example, because the switch 547 connects the transmit amplifier 542 to the antenna 324 (Ant1) so that the antenna 324 (Ant1) can be used as a transmit antenna in this example, the LNA 544 does not receive any signal energy.

In this exemplary embodiment, the receive mixer 560 may receive a receive LO signal from the LO signal generator 522.

In this exemplary embodiment, the receive filter 562 is connected to the Rx/RF detection and sensing element 507 over connection 563.

In an exemplary embodiment where signal energy is part of the incident power output of the power amplifier 542 (FIG. 5A) the return signal is coupled by the directional coupler 548 to the switch 567 over connection 569 and received by the receive mixer 560, the amplitude and phase (td) provided by the receive filter 562 on connection 563 corresponds to the power of the signal output by the power amplifier 542. The coupled signal over connection 569 can be measured and the incident power measurement used to provide transmit power control. The phase (td) is the phase difference between the phase of the coupled return signal and the phase of the signal transmitted by the transmitting antenna (Pinc). In other exemplary embodiments, transmit signal can be transmitted by Ant0 or Ant2 or Ant3 and the return signal measured on the non-transmitting antennas to characterize the device 500.

FIG. 5B is a block diagram showing an exemplary embodiment of a portion of a communication device 500 configured for unlicensed communication. The portion of the communication device 500 shown in FIG. 5B is similar to the portion 500 of the communication device shown in FIG. 5A except with respect to aspects described otherwise below. In FIG. 5B, the communication device 500 shows an exemplary embodiment where transmit power is analyzed by analyzing a signal that is coupled from one antenna to another antenna. In FIG. 5B, a unique signal is transmitted via the antenna 324 (Ant1) and couples to the antenna 326 (Ant2) where a return signal may be directed to the FEM 550. In an exemplary embodiment, the switch 557 may be set to system ground through the termination load (e.g., 50 ohms) 559, thus the directional coupler 558 may be configured to couple energy (via the coupler's switch) from the antenna 326 (Ant2) to the feedback receiver 564.

In an exemplary embodiment, the unique signal transmitted via antenna 324 (Ant1) may couple (or otherwise appear as signal energy) at the antenna 326 (Ant2). In an exemplary embodiment, the coupling of signal energy from the antenna 324 (Ant1) to the antenna 326 (Ant2) may be mutual coupling.

In this example, the antenna 326 (Ant2) is connected to the directional coupler 558 so that the coupled signal energy received at the antenna 326 (Ant2) from the antenna 324 (Ant1) is provided over connection 568 as a return signal to the receive mixer 560 via the switch 567 for processing by the feedback receiver 564 as described herein.

In an exemplary embodiment, the signal on connection 563 in this example can be used to characterize the device 500 and to determine a use state of the device 500 after characterization. For example, the amplitude and phase (td) of the signal on connection 563 can be used to determine whether an antenna is blocked. A blocked antenna may be used to determine how the device is being held (right hand, left hand, near head, etc.). This information can be used to build a lookup table that can characterize various use states of the device, and can be used to determine a device use state. Knowing the use state allows altering a behavior of the device based on the detected use state. For example, the maximum allowable transmitted power from a given antenna may be altered based on a detected use state of the device 500. In another example, the information obtained from the signals related to one or more of the antennas 322 (Ant0), 326 (Ant2) and 328 (Ant3) can be used to determine the position of an object in space or gesture actions, for example, for use when the device 500 is used as a gaming controller.

In an exemplary embodiment, the unlicensed communication circuitry in the device 500 may not be subject to the same constraints as licensed communication circuitry that may also be present in the device 500. For example, the unlicensed communication circuitry in the device 500 may not have specific timing or power requirements (or may have less stringent power requirements) that may dictate transmission time or transmission power. In this manner, unlicensed communication circuitry in the device 500 is suitable for device characterization. In some examples, device state detection may be performed more often or at more opportune times, and/or increased transmit power of the unique transmit signal may allow for greater resolution or distance at which objects or gestures may be detected, as compared to operation of known devices.

FIG. 5C shows an exemplary device characterization table 555 corresponding to FIG. 5B. The device characterization table 555 may include amplitude and phase (td) information for one or more antennas. The phase (td) is the phase difference between the phase of the return signal (Pcoupled) and the phase of the signal transmitted by the transmitting antenna (Pinc). In the example shown in FIG. 5C, device characterization table 555 shows use states US0 (free space), US1 (hand left), US2 (hand right), US3 beside head hand left) and US4 (beside head hand right), that correspond to the use states shown in FIGS. 4B, 4C, 4D, 4E and 4F, respectively. In an exemplary embodiment, the device characterization table 555 shows that antenna 324 (Ant1) transmits a unique signal (e.g., a pilot signal) at a power of 10 dBm. The device characterization table 555 also shows an amplitude (power measured in dBm) and a phase (in degrees relative to antenna 324 (Ant1 in this example), for each of antennas 322 (Ant0), 326 (Ant2) and 328 (Ant3), for each use state US0, US1, US2, US3 and US4. In this manner, an amplitude and phase (td) can be developed for each use state. The phase (td) is the phase difference between the phase of the return signal (Pcoupled) and the phase of the signal transmitted by the transmitting antenna (Pinc). While the switch 567 is described above as coupling one of the antennas 322 (Ant0), 326 (Ant2) and 328 (Ant3) to the feedback receiver (FBRX) 564 at a time and the table 555 is described as having individual power values for each antenna for each use state, signals from multiple antennas may be combined prior to the power values being provided to the Rx/RF detection and sensing element 507. Further, determination of use state may depend on power values from a single receive antenna in some examples, or may be based on values obtained from several receive antennas (e.g., obtained in serial or in parallel, based on transmissions from one antenna or multiple).

Figure 6A:
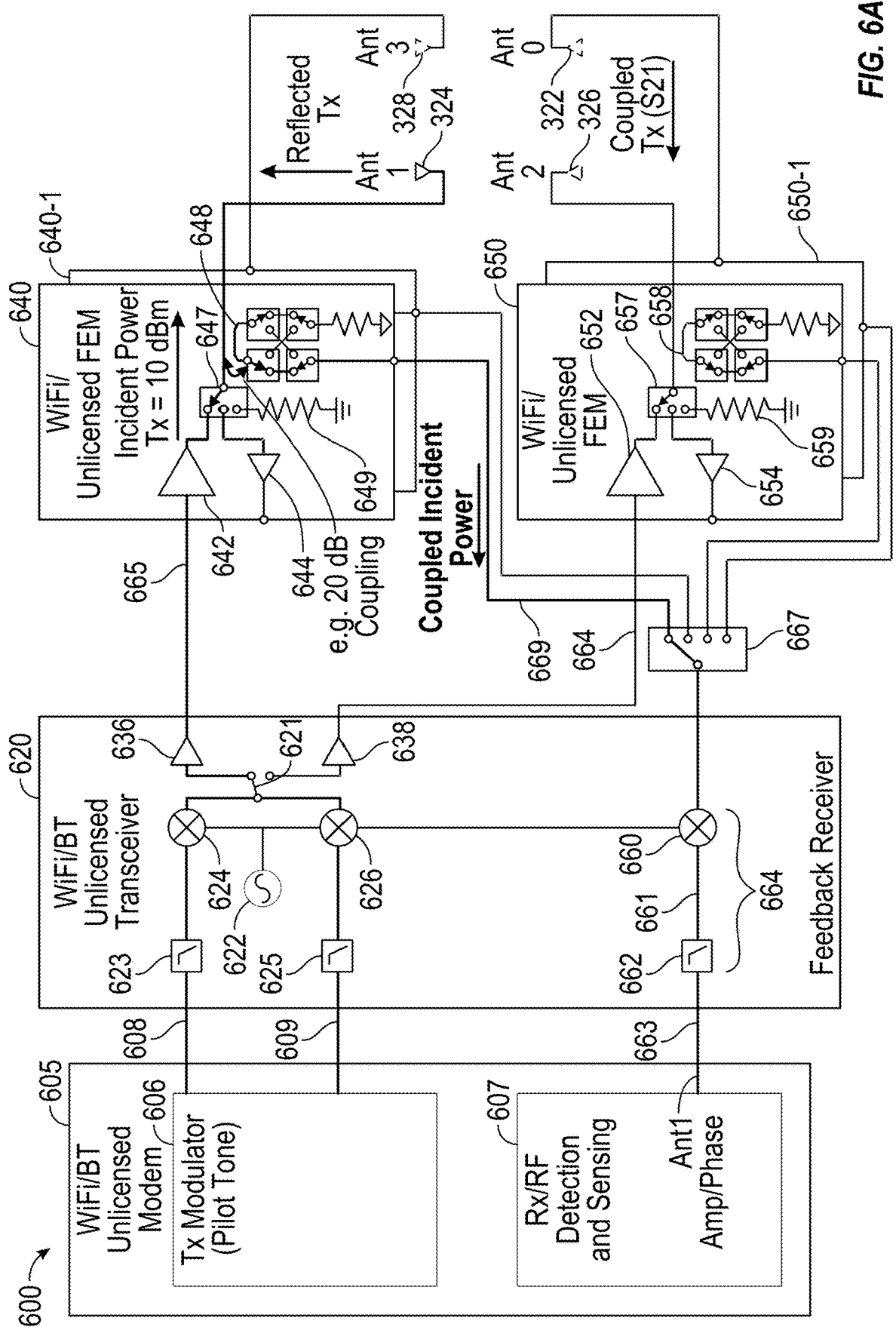
FIG. 6A is a block diagram showing an exemplary embodiment of a portion of a communication device configured for unlicensed communication.

FIG. 6A is a block diagram showing an exemplary embodiment of a portion of a communication device 600 configured for unlicensed communication. The portion of the communication device 600 shown in FIG. 6A is similar to the portion 500 of the communication device shown in FIG. 5A except with respect to aspects described otherwise below. Elements in FIG. 6A that are similar to elements in FIG. 5A will be numbered using the notation 6XX, where an element labeled 6XX in FIG. 6A is similar to an element labeled 5XX in FIG. 5A. The configuration of the communication device 600 shown in FIG. 6A may be used when measuring the incident power and phase of a power amplifier.

In an exemplary embodiment, the communication device 600 may comprise a modem 605, a transceiver 620, a front end module (FEM) 640 and a FEM 650. In an exemplary embodiment, the modem 605, the transceiver 620, the FEM 640 and a FEM 650 may be configured to operate on unlicensed frequency bands, such as those frequency bands associated with WiFi, Bluetooth (BT), or other unlicensed frequency bands. Other unlicensed frequency bands may include, without limitation, 5 GHz WiFi and 5G New Radio-Unlicensed (5G NR-U), among other unlicensed frequency bands. In an exemplary embodiment, the modem 505 may comprise a transmit (Tx) modulator 606 and a receive (Rx)/Radio Frequency (RF) detection and sensing element 607. In an exemplary embodiment, the Tx modulator 606 may be configured to generate a test signal, such as a pilot tone, or another signal having a unique code.

In an exemplary embodiment, the transceiver 620 may comprise a local oscillator (LO) signal generator 622, a transmit filter 623, a transmit filter 625, a transmit mixer 624, a transmit mixer 626, a switch 621, a driver amplifier 636 and a driver amplifier 638. The LO signal generator 622, transmit filter 623, transmit filter 625, transmit mixer 624 and transmit mixer 626 may be similar to the TX LO signal generator 290, baseband (e.g., lowpass) filters 232a and 232b, upconversion mixers 241a and 241b, (and mixer 276 of FIG. 2B) of FIG. 2A.

In an exemplary embodiment, the transceiver 620 may comprise receive filter 662 and receive mixer 660. In an exemplary embodiment, the receive filter 662 and the receive mixer 660 may be, or may form part of what is referred to as a feedback receiver 664, as described above. In an exemplary embodiment, the receiver mixer 660 may receive the LO signal from the Tx LO signal generator 622. In an exemplary embodiment, a switch 667 may be configured to connect the receive mixer 660 to a selected one of the FEM 640, FEM 640-1, FEM 650 and FEM 650-1. In this example, the switch 667 is shown as a four position switch, but the capability of the switch 667 may be based on the number of FEMs and/or antennas coupled thereto.

In an exemplary embodiment, the FEM 640 may comprise a switch 647, a directional coupler 648, a transmit amplifier 642 and a receive amplifier 644. Multiple instances of the FEM 640 may be implemented with FEM 640-n shown for reference. The transmit amplifier 642 may comprise one or more driver stages and power amplifier stages, and may be similar to the PA 244 of FIG. 2A. The receive amplifier 644 may comprise a low noise amplifier (LNA) and may be similar to the LNA 252 of FIG. 2A. In an exemplary embodiment FIG. 6A, the switch 647 may be a three-position switch configured to select among the transmit amplifier 642, the LNA 644 and system ground through a termination load (e.g., 50 ohms) 649. In an exemplary embodiment, the directional coupler 648 is configured to couple a portion of the incident power (Pinc) traveling between the switch 647 and the antenna 324 (Ant1) when the switch 647 selects the power amplifier 642. In this example, incident power (Pinc) energy received at the signal coupler 648 is provided over connection 669 to the receive mixer 660 via the switch 667. In some embodiments, the signal on connection 669 may be referred to as an incident signal (Pinc). In this example where signal energy is received by the receive mixer 660, the amplitude and phase provided by the receive filter 662 on connection 663 corresponds to the incident signal (Pinc) at the antenna 324 (Ant1) in this example. This measured Pinc (signal amplitude and phase) is used as a reference to compare with the return signal. The amount of power appearing on connection 669 is dependent upon a number of factors, including, for example, loading conditions of the antenna 324 (Anil) in this example.

Figure 6B:
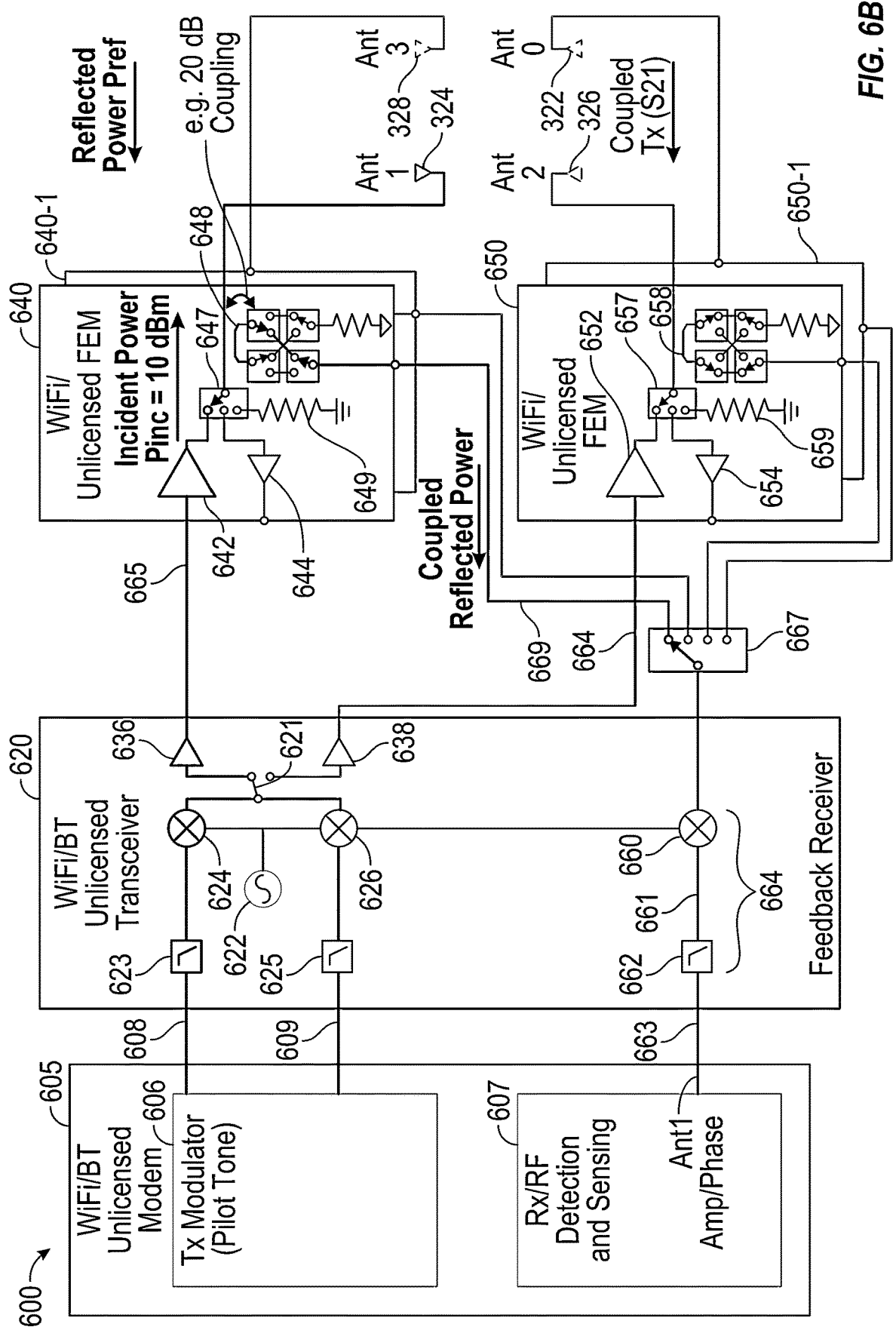
FIG. 6B is a block diagram showing an exemplary embodiment of a portion of a communication device configured for unlicensed communication.

FIG. 6B is a block diagram showing an exemplary embodiment of a portion of a communication device 600 configured for unlicensed communication. The portion of the communication device 600 shown in FIG. 6B is similar to the portion 600 of the communication device shown in FIG. 6A except with respect to aspects described otherwise below. In FIG. 6B, the communication device 600 shows an exemplary embodiment where transmit power is analyzed by analyzing a signal that is coupled from the transmitting antenna 324 (Ant1) and reflected back to the directional coupler 648 due to mismatch. In FIG. 6B, a unique signal is transmitted via the antenna 324 (Ant1) and a reflected signal couples back to the directional coupler 648 where a return signal may be directed onto the connection 669. The return signal appears at the directional coupler 648 and then travels over connection 669 and is then directed by the switch 667 to the receive mixer 660 for processing by the feedback receiver 664 as described herein.

In this example, the antenna 324 (Ant1) reflects a portion of the transmit signal back to the directional coupler 648 so that the return signal (Pref) reflected from 324 (Ant1) received at the directional coupler 648 is provided over connection 669 to the receive mixer 660. In some embodiments, the signal on connection 669 may be referred to as a return signal (Pref) reflected from antenna 324 (Ant1). The amount of power appearing on connection 669 is dependent upon a number of factors, including, for example, loading conditions of the antenna 324 (Ant1) in this example.

By virtue of the signal energy reflected from a transmit antenna, a receive signal will appear at the receive mixer 660 in the feedback receiver 664 (connected to directional coupler 648) over connection 669 in this example.

In this example, because the switch 647 connects the transmit amplifier 642 to the antenna 324 (Ant1) so that the antenna 324 (Ant1) can be used as a transmit antenna, the LNA 644 does not receive any signal energy.

In this exemplary embodiment, the receive filter 662 is connected to the Rx/RF detection and sensing element 607 over connection 663.

In this example where signal energy is received by the receive mixer 660, the amplitude and phase (td) provided by the receive filter 662 on connection 663 corresponds to the return signal (Pref) reflected from the antenna 324 (Ant1). The phase (td) here is the phase difference between the phase of the return signal (Pref) reflected from 324 Ant1 and the phase of the incident signal Power (Pinc).

FIG. 6C shows exemplary device characterization tables 655 and 675. The characterization tables 655 and 675 show the incident power (Pinc) of signals transmitted by each of the antennas 322 (Ant0), 324 (Ant1), 326 (Ant2), and 328 (Ant3) and in this example, the return reflected power (Pref) shown on the various individual antennas (Ant0, Ant1, Ant2 and Ant3) for the various use states. The values of reflected power (Pref) shown for each of the antennas and each use state allow use state to be determined.

In an exemplary embodiment, the signal on connection 663 in this example can be used to characterize the device 600 and to determine a use state of the device 600 after characterization. For example, based on the amplitude and phase (td) of the signal on connection 663 in this example, the impedance of the antenna 324 (Ant1) can be determined, which can be used to determine whether the antenna is blocked. A blocked antenna may be used to determine how the device is being held (right hand, left hand, near head, etc.). This information can be used to build a lookup table that can characterize various use states of the device, and can be used to determine a device use state. Knowing the use state allows altering a behavior of the device based on the detected use state. For example, the maximum allowable transmitted power from a given antenna may be altered based on a detected use state of the device 600. In another example, the information obtained from the signals (as described previously) related to one or more of the antennas 322 (Ant0), 326 (Ant2) and 328 (Ant1) can be used to determine the loading conditions of the antennas of the device 600, thereby characterizing and determining the use state of the device from the LUT or the gesture inferred by the device. Determination of use state may depend on power values from a single receive antenna in some examples, or may be based on values obtained from several receive antennas (e.g., obtained in serial or in parallel, based on transmissions from one antenna or multiple).

In an exemplary embodiment, the unlicensed communication circuitry in the device 600 may not be subject to the same constraints as licensed communication circuitry that may also be present in the device 600. For example, the unlicensed communication circuitry in the device 600 may not have specific timing or power requirements (or may have less stringent power requirements) that may dictate transmission time or transmission power. In this manner, unlicensed communication circuitry in the device 600 is suitable for device characterization. In some examples, device state detection may be performed more often or at more opportune times, and/or increased transmit power of the unique transmit signal may allow for greater resolution or distance at which objects or gestures may be detected, as compared to operation of known devices.

Figure 7:
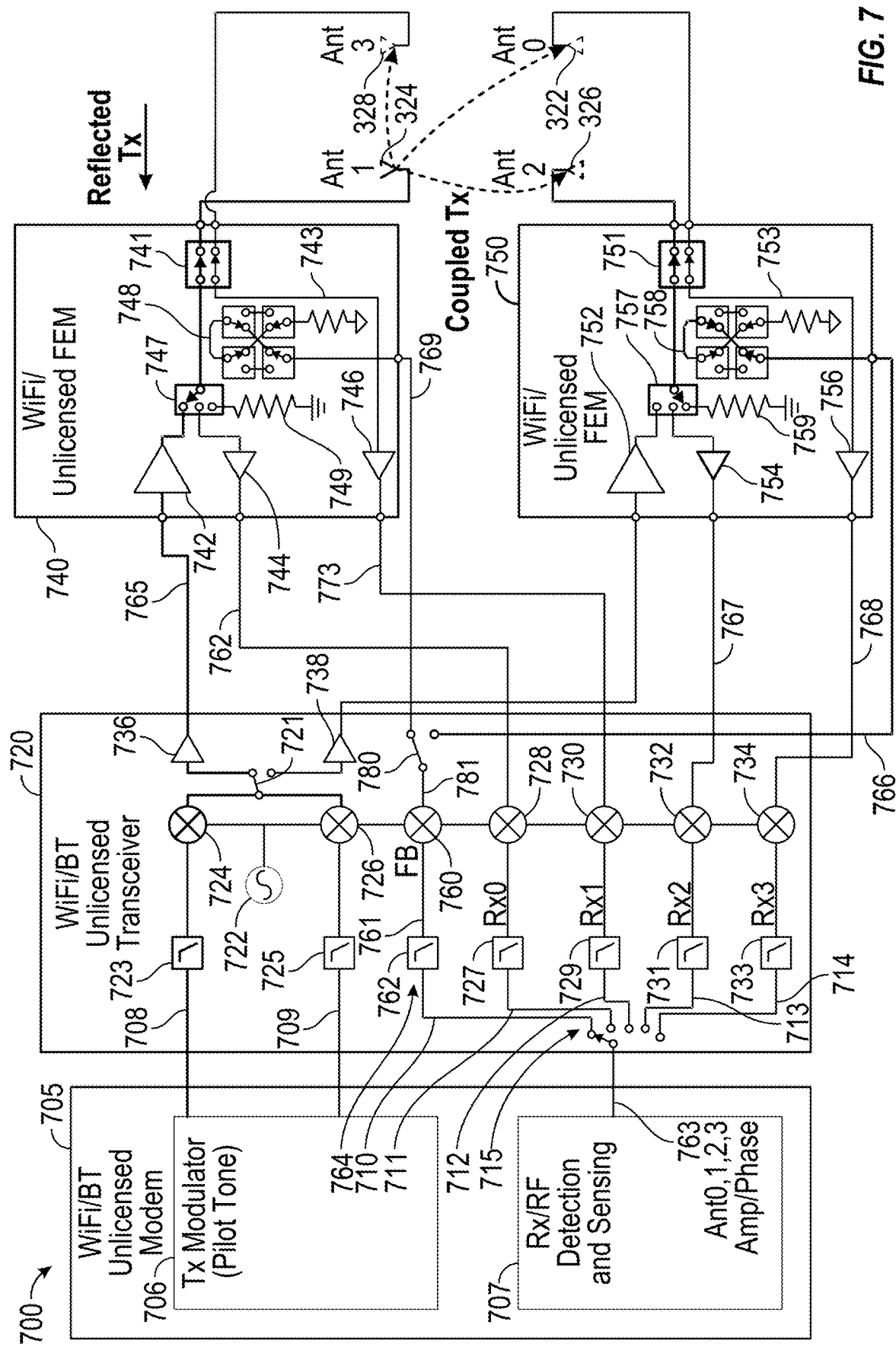
FIG. 7 is a block diagram showing an exemplary embodiment of a portion of a communication device configured for unlicensed communication.

FIG. 7 is a block diagram showing an exemplary embodiment of a portion of a communication device 700 configured for unlicensed communication.

The portion of the communication device 700 shown in FIG. 7 is similar to the portion 400 of the communication device shown in FIG. 4A, is similar to the portion 500 of the communication device shown in FIG. 5A, and is similar to the portion 600 of the communication device shown in FIG. 6A except with respect to aspects described otherwise below. Elements in FIG. 7 that are similar to elements in FIG. 4A will be numbered using the notation 7XX, where an element labeled 7XX in FIG. 7 is similar to an element labeled 4XX in FIG. 4A, elements in FIG. 7 that are similar to elements in FIG. 5A will be numbered using the notation 7XX, where an element labeled 7XX in FIG. 7 is similar to an element labeled 5XX in FIG. 5A, and elements in FIG. 7 that are similar to elements in FIG. 6A will be numbered using the notation 7XX, where an element labeled 7XX in FIG. 7 is similar to an element labeled 6XX in FIG. 6A.

In an exemplary embodiment, the communication device 700 may comprise a modem 705, a transceiver 720 a front end module (FEM) 740 and a FEM 750. In an exemplary embodiment, the modem 705, the transceiver 720, the FEM 740 and a FEM 750 may be configured to operate on unlicensed frequency bands, such as those frequency bands associated with WiFi, Bluetooth (BT), or other unlicensed frequency bands. Other unlicensed frequency bands may include, without limitation, 5 GHz WiFi and 5G New Radio-Unlicensed (5G NR-U), among other unlicensed frequency bands. In an exemplary embodiment, the modem 705 may comprise a transmit (Tx) modulator 706 and a receive (Rx)/Radio Frequency (RF) detection and sensing element 707. In an exemplary embodiment, the Tx modulator 706 may be configured to generate a test signal, such as a pilot tone, or another signal having a unique code.

In an exemplary embodiment, the transceiver 720 may comprise a local oscillator (LO) signal generator 722, a transmit filter 723, a transmit filter 725, a transmit mixer 724, a transmit mixer 726, a switch 721, a driver amplifier 736 and a driver amplifier 738. The LO signal generator 722, transmit filter 723, transmit filter 725, transmit mixer 724 and transmit mixer 726 may be similar to the TX LO signal generator 290, baseband (e.g., lowpass) filters 232a and 232b, amplifiers 234a and 234b, and upconversion mixers 241a and 241b of FIG. 2A.

In an exemplary embodiment, the transceiver 720 may comprise receive filters 727, 729, 731 and 733, and may comprise receive mixers 728, 730, 732 and 734.

The receive filters 727, 729, 731 and 733 may be similar to the baseband (e.g., lowpass) filters 264a and 264b of FIG. 2A. The receive mixers 728, 730, 732 and 734 may be similar to the downconversion mixers 261a and 261b of FIG. 2A.

In an exemplary embodiment, the transceiver 720 may comprise receive filter 762 and receive mixer 760. In an exemplary embodiment, the receive filter 762 and the receive mixer 760 may be, or may form part of what is referred to as a feedback receiver 764, as described above. In an exemplary embodiment, the receive mixer 760 may receive the LO signal from the Tx LO signal generator 722.

A switch 780 may be coupled to the receive mixer 760 over a connection 781 and may be configured to switchably connect the receive mixer 760 to a connection 769 or to a connection 766.

In an exemplary embodiment, the FEM 740 may comprise a switch 747, a directional coupler 748, a switch 741, a transmit amplifier 742 and receive amplifiers 744 and 746. The transmit amplifier 742 may comprise one or more driver stages and power amplifier stages, and may be similar to the PA 244 of FIG. 2A. The transmit amplifier 742 may be connected to antenna 324 (Ant1) or antenna 328 (Ant3) via the switch 741. In an exemplary embodiment, the switch 741 may be a dual pole dual throw (DPDT) switch. The receive amplifiers 744 and 746 may each comprise a low noise amplifier (LNA) and may be similar to the LNA 252 of FIG. 2A.

In an exemplary embodiment, the switch 747 may be a three-position switch configured to select among the transmit amplifier 742, the LNA 744 and through a termination load (e.g., 50 ohms) 749. In an exemplary embodiment, the switch 741 may be configured to connect among antenna 324 (Ant1), antenna 328 (Ant3), the LNA 756 and the switch 747. In an exemplary embodiment, a logic "0" configures the switch 741 (as shown in FIG. 7) to connect the antenna 324 (Ant1) to the switch 747 through the directional coupler 748. In an exemplary embodiment, the-directional coupler 748 is configured to couple a portion of the signal traveling between the switch 741 (i.e., the antenna 324 (Ant1) in this example) and the switch 747 when the switch 747 is set to connect to the transmit amplifier 742. In the example shown in FIG. 7, the switch 747 is set to connect the transmit amplifier 742 to the antenna 324 (Ant1) via the directional coupler 748 and the switch 741. In this exemplary embodiment, the switch 741 is also configured to connect the antenna 328 (Ant3) to the LNA 746 over connection 743.

In an exemplary embodiment, the FEM 750 may comprise a switch 757, a directional coupler 758, a transmit amplifier 752, a switch 751, and receive amplifiers 754 and 756. The transmit amplifier 752 may comprise one or more driver stages and power amplifier stages, and may be similar to the PA 244 of FIG. 2A. The receive amplifiers 754 and 756 may each comprise a low noise amplifier (LNA) and may be similar to the LNA 252 of FIG. 2A. The LNA 754 may be connected to the receive mixer 732 over connection 767 and the LNA 756 may be connected to the receive mixer 734 over connection 768.

In an exemplary embodiment, the switch 757 may be a three-position switch configured to select among the transmit amplifier 752, the LNA 754 and ground through a termination load (e.g., 50 ohms) 759. In an exemplary embodiment, the switch 751 may be a DPDT switch similar to the switch 741 configured to connect among the antenna 326 (Ant2), antenna 322 (Ant0), the LNA 756 and switch 757. In an exemplary embodiment, a logic "0" configures the switch 751-to connect the antenna 326 (Ant2) to the switch 757 through the directional coupler 758. In an exemplary embodiment, the directional coupler 758 is configured to couple a portion of the signal traveling between the switch 751 (i.e., the antenna 326 (Ant2) in this example) and the switch 757 when the switch 757 is set to system ground through the termination load 759 (e.g., 50 ohms). In the example shown in FIG. 7, the switch 757 is set to connect the termination load 759 (50 ohms) to the antenna 326 (Ant2) via the directional coupler 758 and the switch 751. The switch 751 also connects the antenna 322 (Ant0) to the LNA 756 over connection 753.

In accordance with an exemplary embodiment, the Tx modulator 706 is configured to provide a unique signal (such as a pilot tone) over connection 708 to the transmit filter 723 and to the transmit mixer 724 and over connection 709 to the transmit filter 725 and to the transmit mixer 726. The output of the transmit mixer 724 and the output of the transmit mixer 726 are summed together and provided through the switch 721 to the driver amplifier 736 or to the driver amplifier 738. In this exemplary embodiment, the summed output of the mixers 724 and 726 are provided to the driver amplifier 736 and over connection 765 to the transmit amplifier 742. In this manner, the unique signal may be transmitted via the switch 741 and the antenna 324 (Ant1), in this example.

In an exemplary embodiment, the unique signal transmitted via antenna 324 (Ant1) may couple (or otherwise appear as signal energy) at the antenna 322 (Ant0), antenna 326 (ant2) and the antenna 328 (Ant3); or may be reflected back toward the BEM 740 by the antenna 324 (Ant1).

For example, if the switch 780 is set to connect the directional coupler 748 to the receive mixer 760 in the feedback receiver 764, then the return signal (Pref) reflected from the antenna 324 (Ant1) through the directional coupler 748 and connection 769 appears as a return signal (Pref) reflected from the antenna 324 (Ant1) at the receive mixer 760. In some embodiments, the signal on connection 769 may be referred to as a return signal.

The return signal (Pref) reflected from a transmit antenna, appears at the receive mixer 760 (connected to directional coupler 748 via the switch 780 in this example) over connection 769 in this example.

However, if the switch 780 is set to connect the directional coupler 758 to the receive mixer 760, then the energy coupled from the antenna 326 (Ant2 in this example) through the directional coupler 758 and connection 766 appears as a return signal (coupled) at the receive mixer 760. In some embodiments, the signal on connection 766 may be referred to as a return signal.

In this example, the antenna 326 (Ant2) is connected to the directional coupler 758 so that the coupled signal energy received at the antenna 326 (Ant2) is provided over connection 766 and via the switch 780 to the receive mixer 760.

In this example, the switch 747 and the switch 741 connect the transmit amplifier 742 to the antenna 324 (Ant1) so that the antenna 324 (Ant1) can be used as a transmit antenna in this example, and the LNA 746 is connected to the antenna 328 (Ant3).

In this exemplary embodiment, the receive mixers 728, 730, 732 and 734 and the receive mixer 760 may receive a receive LO signal from the LO signal generator 722.

In this exemplary embodiment, the receive mixer 728 is connected to the receive filter 727, the receive mixer 730 is connected to the receive filter 729, the receive mixer 732 is connected to the receive filter 731 and the receive mixer 734 is connected to the receive filter 733. The receive mixer 760 is connected to the receive filter 762 over connection 761.

In this exemplary embodiment, the receive filters 727, 729, 731 and 733 and 762 are connected to a switch 715 over respective connections 710, 711, 712, 713 and 714. The switch 715 may be a multiple-position switch that connects one or more of the receive filters 727, 729, 731 and 733 and 762 to the Rx/RF detection and sensing element 707 over connection 763. In the example shown in FIG. 7, the switch 715 is configured to connect the output of the receive filter 762 over connection 710 to the Rx/RF detection and sensing element 707.

In an example where the switch 780 is configured such that a return signal (Pref) reflected by the antenna 324 Ant1 is received by the receive mixer 760 over connection 769, the amplitude and phase (td) provided by the receive filter 762 on connection 710 corresponds to the signal reflected by the antenna 324 (Ant1). The phase (td) is the phase difference between the phase of the return signal (Pref) reflected from the antenna 324 (Ant1) and the phase of the incident signal (Pinc) at the output of the power amplifier 742.

In an example where the switch 780 is configured such that the return signal is received by the receive mixer 760 over connection 766, the amplitude and phase (td) provided by the receive filter 762 on connection 710 corresponds to the signal energy coupled to the antenna 326 (Ant 2).

In an example where the switch 741 is configured such that the return signal (Pcoupled) via LNA 746 is received by the receiver mixer 730 over connection 773 the amplitude and phase (td) provided by the receive filter 729 on connection 712 corresponds to the signal coupled to antenna 328 (Ant1). The phase (td) is the phase difference between the phase of the return signal (Pcoupled) and the phase of the signal transmitted by the transmitting antenna 324 (Ant1) (Pinc), in this example.

In an example where the switch 751 is configured such that the return signal (Pcoupled) via LNA 756 is received by the receive mixer 734 over connection 768 the amplitude and phase (td) provided by the receive filter 733 on connection 714 corresponds to the signal coupled to the antenna 322 (Ant0). The phase (td) is the phase difference between the phase of the return signal (Pcoupled) and the phase of the signal transmitted by the transmitting antenna (Pinc) 324 (Ant1) in this example.

In an example where the switch 751 is configured such that a return signal (Pcoupled) via LNA 754 connected to switch 757 is received by the receiver mixer 732 over connection 767 the amplitude and phase (td) provided by the receive filter 731 on connection 713 corresponds to the signal coupled to the antenna 326 (Ant2). The phase (td) is the phase difference between the phase of the return signal (Pcoupled) and the phase of the signal transmitted by the transmitting antenna (Pinc) (324 (Ant1), in this example.

In an exemplary embodiment, one or more of the signals on connection 763 in this example can be used to characterize the device 700 and to determine a use state of the device 700 after characterization. For example, based on the amplitude and phase (td) of the signal on connection 763 in this example, the return signal (Pref) reflected from the antenna 324 (Ant1) and the return signal (Pcoupled) at antenna 326 (Ant2), antenna 328 (Ant3) and antenna 322 (Ant0) can be determined, which can be used to determine whether one or more of the antennas are blocked. A blocked antenna may be used to determine how the device is being held (right hand, left hand, near head, etc.). This information can be used to build a lookup table that can characterize various use states of the device, and can be used to determine a device use state. Knowing the use state allows altering a behavior of the device based on the detected use state. For example, the maximum allowable transmitted power from a given antenna may be altered based on a detected use state of the device 700. In another example, the information obtained from the signals related to one or more of the antennas 324 (Ant1), 322 (Ant0), 326 (Ant2) and 328 (Ant3) can be used to determine the position of an object in space or recognize gesture actions, for example, for use when the device 700 is used as a gaming controller.

In another example, similar characterization and use state determination can be performed with other antennas (328 (Ant3), 322 (Ant0), 326 (Ant2)) transmitting by setting the appropriate switches and their corresponding logics.

In an exemplary embodiment, the unlicensed communication circuitry in the device 700 may not be subject to the same constraints as licensed communication circuitry that may also be present in the device 700. For example, the unlicensed communication circuitry in the device 700 may not have specific timing or power requirements (or may have less stringent power requirements) that may dictate transmission time or transmission power. In this manner, unlicensed communication circuitry in the device 700 is suitable for device characterization. In some examples, device state detection may be performed more often or at more opportune times, and/or increased transmit power of the unique transmit signal may allow for greater resolution or distance at which objects or gestures may be detected, as compared to operation of known devices.

Figure 8A:
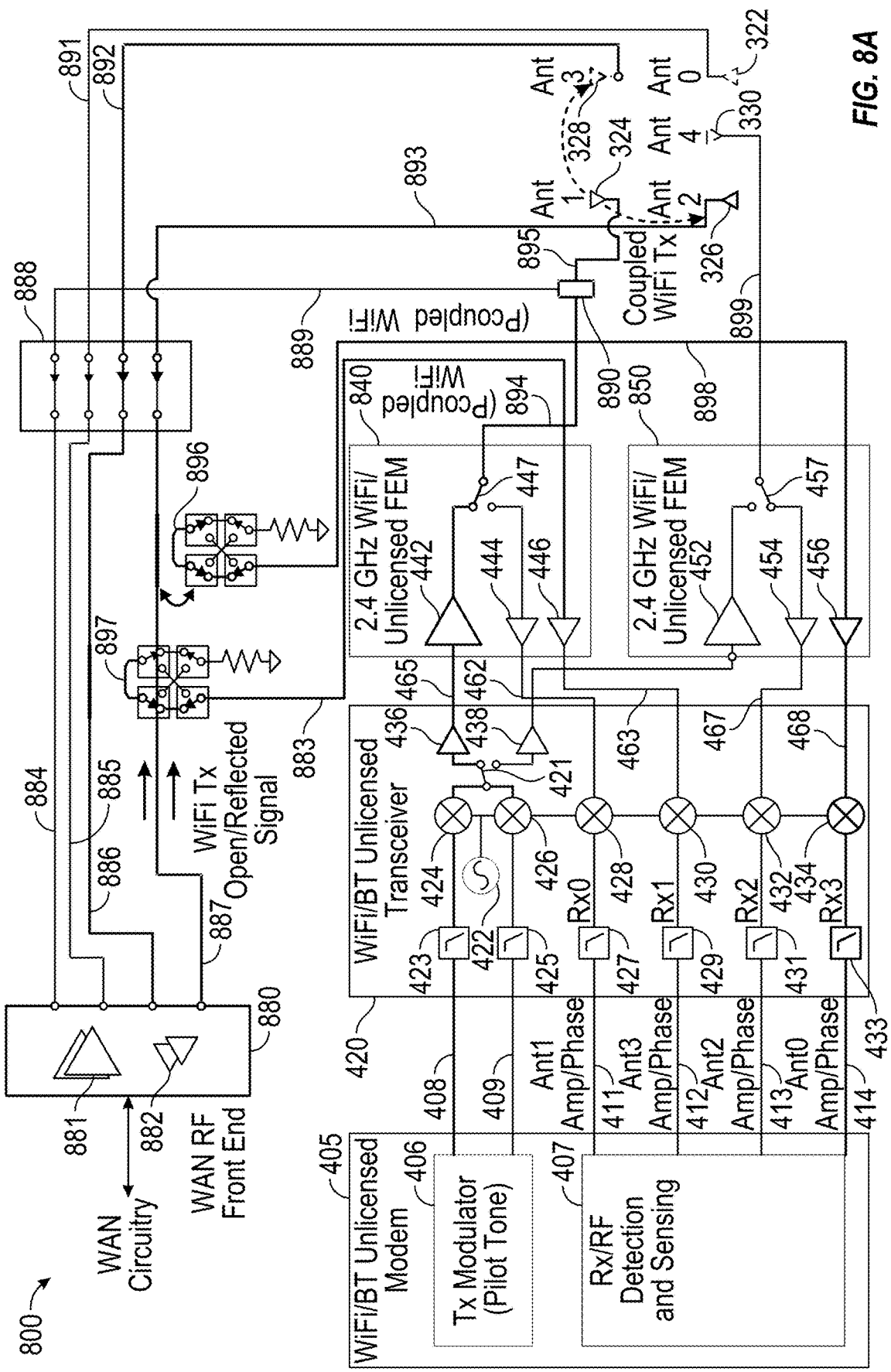
FIG. 8A is a block diagram showing an exemplary embodiment of a portion of a communication device configured for licensed and unlicensed communication.

FIG. 8A is a block diagram showing an exemplary embodiment of a portion of a communication device 800 configured for licensed and unlicensed communication. The exemplary embodiment shown in FIG. 8A describes the sharing of WAN antennas with an unlicensed band (e.g., 2.4 GHz WiFi) for use state characterization and determination. The exemplary WiFi 2.4 GHz signal will be reflected by the WAN front end circuits because they are an open circuit at frequencies in the 2.4 GHz band. These reflected signals can be used for use state characterization and determination as described herein.

The portion of the communication device 800 shown in FIG. 8A is similar to the portion 400 of the communication device shown in FIG. 4A except with respect to aspects described otherwise below. Elements in FIG. 8A that are similar to elements in FIG. 4A will be numbered using the notation 8XX, where an element labeled 8XX in FIG. 8A is similar to an element labeled 4XX in FIG. 4A.

In an exemplary embodiment, the portion of the communication device 800 includes components that allow the communication device 800 to communicate on licensed frequency bands as well as on unlicensed communication bands.

For example, the portion of the communication device 800 includes a wide area network (WAN) front end module 880, a switch 888 and a WiFi extractor 890. The WAN front end module 880 may communicate with other WAN signal processing and communication circuitry, such as a modem and/or a transceiver.

In an exemplary embodiment, the WAN front end module 880 may comprise one or more transmit amplifiers 881 and one or more receive amplifiers (LNAs) 882. Although shown as a single element for convenience of illustration, the WAN front end module 880 may comprise multiple instances that may be configured to communicate on multiple communication bands. Further, although shown as a single element having transmit amplifiers and LNAs, the WAN front end module 880 may be implemented as separate transmit and receive elements.

In an exemplary embodiment, the WAN front end module 880 may be coupled to the switch 888 over exemplary connections 884, 885, 886 and 887. The switch 888 may also be connected to the WiFi extractor 890 over connection 889, antenna 322 (Ant0) over connection 891, antenna 328 (Ant3) over connection 892 and to antenna 326 (Ant2) over connection 893. The WiFi extractor 890 may be connected to antenna 324 (Ant1) over connection 895. The WiFi extractor 890 may also be connected to the switch 447 over connection 894.

In an exemplary embodiment, another antenna 330 (ant4) may be connected to the switch 457 over connection 899.

In an exemplary embodiment, the portion of the communication device 800 may include a 2.4 GHz WiFi/Unlicensed FEM 840 and a 2.4 GHz WiFi/Unlicensed FEM 850.

The portion of the communication device 800 also includes a directional coupler 897 and a directional coupler 896. The directional coupler 897 may be configured to couple to a signal on connection 886 and to connection 883 which is connected to the receiver amplifier 446 in the 2.4 GHz WiFi/Unlicensed FEM 840. The directional coupler 896 may be configured to couple a signal on connection 887 to connection 898, which is also connected to the receive amplifier 456 in the 2.4 GHz WiFi/Unlicensed FEM 850.

In an exemplary embodiment, a unique signal may be transmitted from the antenna 324 (Ant1) via the Tx modulator 406 as described above. The directional coupler 897 may provide a return signal (Pcoupled WiFi) reflected from the WAN RF front end 880 and the directional coupler 896 may provide a return signal (Pcoupled) from the WAN RF front end 880. The return signal from the directional coupler 897 may be provided to the LNA 446 over connection 883 and the return signal from the directional coupler 896 may be provided to the LNA 456 over connection 898.

The information in the return signals (on connection 883 and/or 898, and/or other return signals as described above) can be used to build a lookup table that can characterize various use states of the device, and can be used to determine a device use state as described above. Knowing the use state allows one or more behaviors of the device to be altered based on the detected use state. For example, the maximum allowable transmitted power from a given antenna may be altered based on a detected use state of the device 800.

Figure 8B:
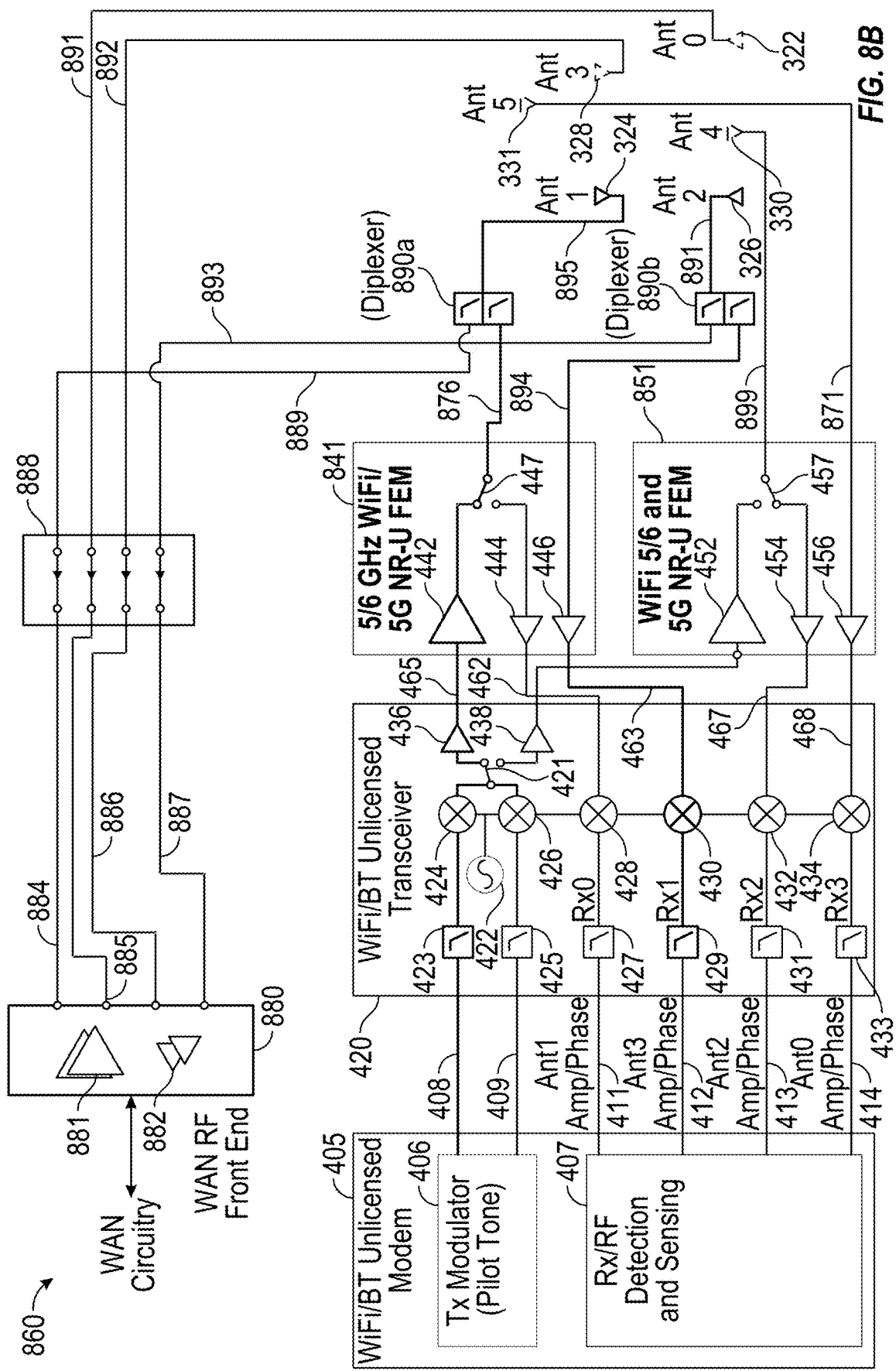
FIG. 8B is a block diagram showing an exemplary embodiment of a portion of a communication device configured for licensed and unlicensed communication.

FIG. 8B is a block diagram showing an exemplary embodiment of a portion of a communication device 860 configured for licensed and unlicensed communication. The exemplary embodiment shown in FIG. 8B describes the sharing of WAN antennas with additional unlicensed bands (5/6 GHz WiFi/5G NR-U) for use state characterization and determination.

The portion of the communication device 860 shown in FIG. 8B is similar to the portion 800 of the communication device shown in FIG. 8A except with respect to aspects described otherwise below. Elements in FIG. 8B that are similar to elements in FIG. 8A will be numbered using the notation 8XX, where an element labeled 8XX in FIG. 8B is similar to an element labeled 8XX in FIG. 8A.

In an exemplary embodiment, the portion of the communication device 860 includes components that allow the communication device 860 to communicate on licensed frequency bands as well as on unlicensed communication bands.

In the exemplary embodiment shown in FIG. 8B, a diplexer 890a is connected to the antenna 324 (Ant1) over connection 895, is connected to the switch 888 over connection 889 and is connected to the switch 447 over connection 876. In the exemplary embodiment shown in FIG. 8B, a diplexer 890b is connected to the antenna 326 (Ant2) over connection 891, is connected to the switch 888 over connection 893 and is connected to the LNA 446 over connection 894.

In this exemplary embodiment, the unique signal may be transmitted from the antenna 324 (Ant1) via Tx modulator 406, transceiver 420 and 5/6 GHz WiFi/5G NR-U FEM 841 and the LNA 446 may receive the return signal (coupled WiFi Tx) via the antenna 326 (Ant2) on connection 894. The LNA 454 may receive a return signal via antenna 330 (Ant4) on connection 899 and the LNA 456 may receive a return signal via antenna 331 (Ant 5) on connection 871. The information in the return signals can be used to build a lookup table that can characterize various use states of the device, and can be used to determine a device use state, as described above. Knowing the use state allows one or more behaviors of the device to be altered based on the detected use state. For example, the maximum allowable transmitted power from a given antenna may be altered based on a detected use state of the device 800. Similarly, a unique signal may be transmitted from the antenna 330 (Ant4) via power amplifier 452 and may receive return signals on: antenna 324 (Ant1) via LNA 444; antenna 326 (Ant 2) via LNA 446; antenna (Ant 5) via LNA 456. The information in the return signals can be used to build a lookup table that can characterize various use states of the device, and can be used to determine a device use state.

FIGS. 9A, 9B, 9C, 9D and 9E are drawings showing exemplary use states of a communication device. The exemplary use states shown in FIGS. 9A, 9B, 9C, 9D and 9E, may be determined in accordance with the system and method for RF sensing described herein.

Figure 9A:
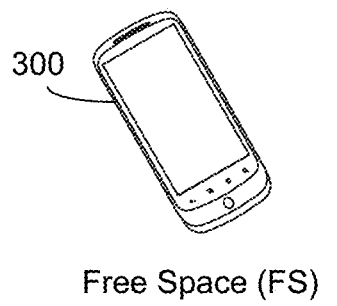
FIGS. 9A, 9B, 9C, 9D and 9E drawings showing exemplary use states of a communication device.

FIG. 9A shows an exemplary free space use state, where the communication device 300 is determined to be located in free space.

Figure 9B:
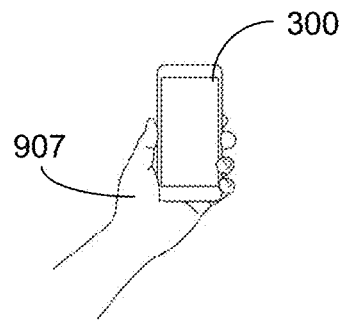

FIG. 9B shows an exemplary hand left (HL) use state, where the communication device 300 is determined to be located in a user's left hand 907.

Figure 9C:
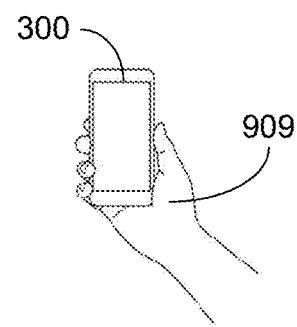

FIG. 9C shows an exemplary hand right (HR) use state, where the communication device 300 is determined to be located in a user's right hand 909.

Figure 9D:
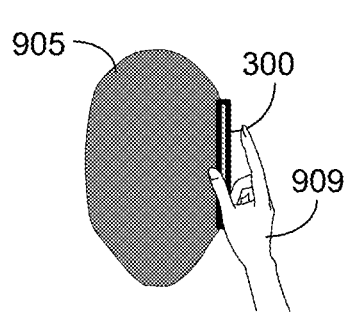

FIG. 9D shows an exemplary beside head hand right (BHHR) use state, where the communication device 300 is determined to be located in a user's right hand 909 and beside a right side of the head of the user 905 (user 905 is facing away in this example).

Figure 9E:
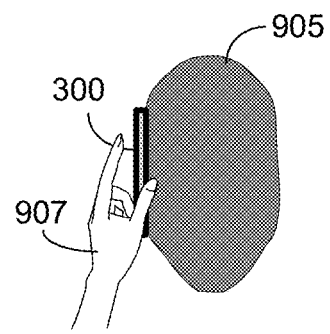

FIG. 9E shows an exemplary beside head hand left (BHHL) use state, where the communication device 300 is determined to be located in a user's left hand 907 and beside a left side of the head of the user 905 (user 905 is facing away in this example). Use states other than those illustrated in FIGS. 9A-9E may be determined in addition or instead.

FIGS. 10A, 10B, 10C and 10D are drawings showing exemplary use states of a communication device and a look up table (LUT) that can be used when characterizing a device.

FIG. 10A shows a communication device 300 in a free space use state that will be referred to as use state 0 (US0).

FIG. 10B shows a communication device 300 in a left hand (HL) use state that will be referred to as use state 1 (US1). In this example, the user's left hand 1007 is adjacent to antenna 322 (Ant0) and antenna 326 (Ant2). In this example, antenna 324 (Ant1) and antenna 328 (Ant3) remain unobstructed.

FIG. 10C shows a communication device 300 in a beside head hand right (BHHR) use state that will be referred to as use state 4 (US4). In this example, the communication device 300 is adjacent to a user's head 1005. In this exemplary embodiment, antenna 324 (Ant1) and antenna 328 (Ant3) are close to a user's head 1005. In this exemplary embodiment, a palm of a user's right hand 1009 is beside antenna 322 (Ant0). In this example, antenna 326 (Ant2) is unobstructed.

Although only three use states (US0, US1 and US4) are pictured in FIGS. 10A, and 10C, other use states, such as the use states described in FIGS. 9A, 9B, 9C, 9D and 9E, and other states are also contemplated.

FIG. 10D shows an exemplary look up table (LUT) 1050. In this example, the LUT 1050 comprises device parameter, maximum transmit power allowable per antenna information relating to a use state of a device, such as communication device 300. For example, the LUT 1050 may include maximum allowable antenna power information relating to the use states, US0, US1 and US4, described in FIGS. 10A, 10B and 10C, and also include maximum allowable antenna power information relating to the other use states, shown in FIGS. 9A, 9B, 9C, 9D and 9E, for example. In an exemplary embodiment, the LUT 1050 may include information that shows the maximum power allowable per antenna based on the detected use state of the communication device 300.

There are several ways a LUT table, such as the LUT 1050 can be implemented. There can be a machine learning (ML) based approach, where an inference model could be trained on the various data sets (use states) and the corresponding parametric values, and deduce the antenna transmit power to use for the use case detected. Sensors and other data available on the device could also be combined with this information to affirm or add other conditions, such as horizontal position, vertical position, left hand grip vs right hand grip, etc. to further enhance the probability of the use case being detected to factor in the appropriate transmit requirements.

Figure 11:
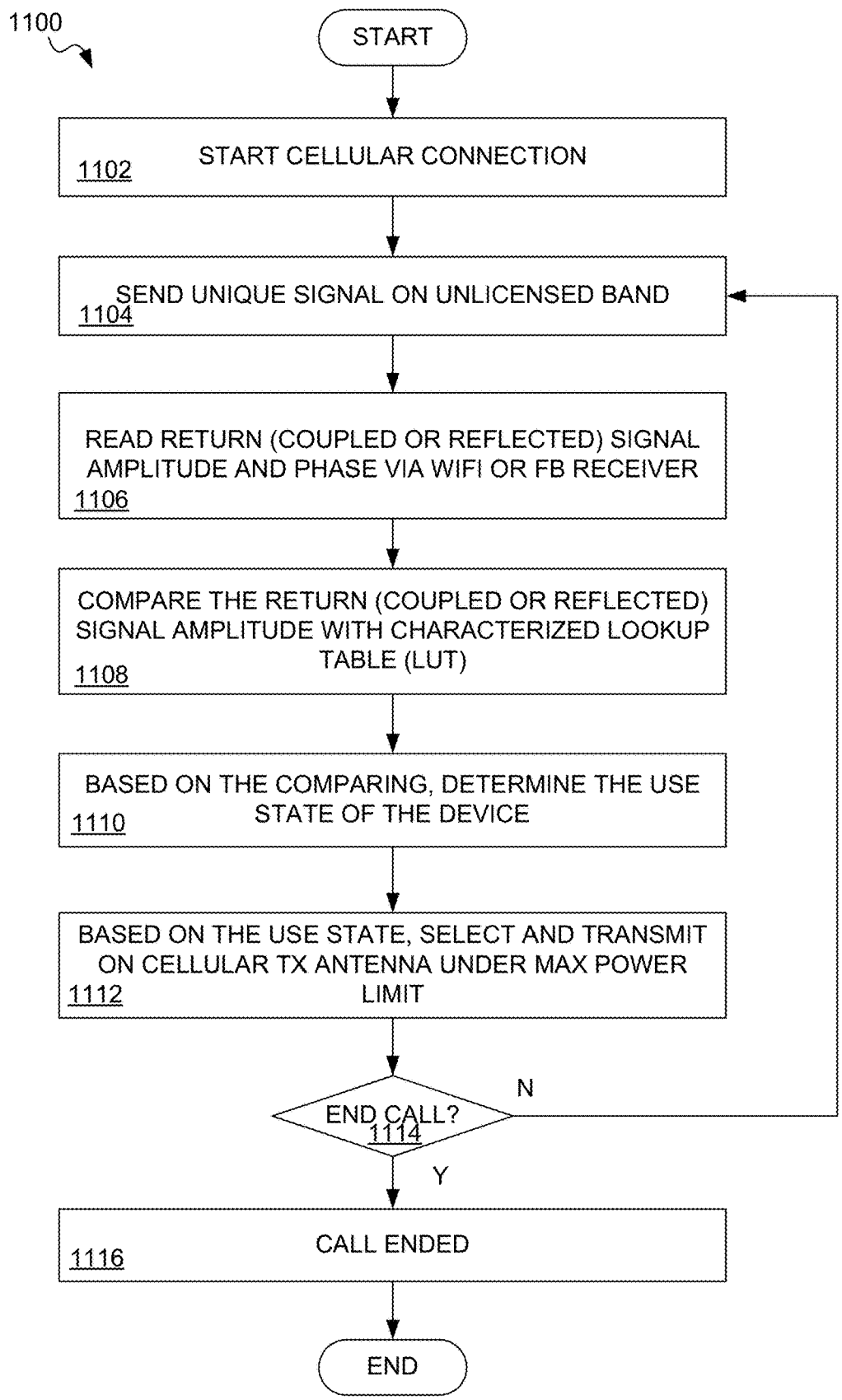
FIG. 11 is a flow chart describing an example of the operation of a method for altering an operating parameter of a device.

FIG. 11 is a flow chart describing an example of the operation of a method 1100 for altering an operating device parameter. Exemplary device parameters include, for example, maximum power control of a WAN and/or a WiFi transmitter, transmit antenna selection, antenna tuning, etc., of a device. The blocks in the method 1100 can be performed in or out of the order shown, and in some embodiments, can be performed at least in part in parallel.

In block 1102, a cellular connection is established on a communication device. For example, any of the communication devices 400, 500, 600, 700 and 800 described herein may establish a cellular communication connection, or another connection using circuitry that operates on a licensed frequency band.

In block 1104, a communication device sends a unique signal on an unlicensed frequency band, such as a pilot signal. For example, the communication device 400 may send a pilot signal using the Tx modulator 406 to generate a pilot signal that is transmitted by the transmit amplifier 442 over antenna 324 (Ant1). In an exemplary embodiment, because the pilot signal is being sent over an unlicensed frequency band, there are few, if any, timing and power requirements that dictate the conditions under which the unlicensed pilot signal may be sent. The unlicensed pilot signal may be sent periodically according to a schedule, or may be sent on demand. In some examples, a system or sub-system for licensed communication in the device may communicate with a system or sub-system for unlicensed communication in the device to determine when to send the pilot signals. In some examples, a system (e.g., an exposure management system) that coordinates with multiple transmission systems or sub-systems (e.g., licensed and unlicensed) may determine when the system for licensed communication will require a use state determination and causes the system for unlicensed communication to send the pilot signal accordingly. In some examples, use state detection may be performed more often or at more opportune times, and/or increased transmit power of the unique transmit signal may allow for greater resolution or distance at which objects may be detected as compared to operation of known devices.

In block 1106, a return signal responsive to the unlicensed unique signal transmitted in block 1104, such as a reflected or coupled signal, may be received and analyzed by unlicensed receiver circuitry, such as a WiFi receiver or a feedback receiver, to determine, for example, amplitude and phase (td). For example, one or more return signals may be provided to the receive mixers 430, 432 and/or 434 of FIG. 4A, or a return signal comprising a coupled signal or a reflected return signal may be provided to the receive mixer 560 of a feedback receiver (FIG. 5A), 660 (FIG. 6A) and 760 (FIG. 7A).

In block 1108, an amplitude and phase (td) of the return signal may be compared against amplitude and phase (td) values that may correspond to prior characterized use states that may be stored in a look up table (LUT) to determine a current use state of the communication device. The device performing this comparison may be the same device that was used to fill in (or edit) the values in the LUT, or may be a different device. For example, a device may input the values in the LUT or refine them over time based on measurements taken during use of the device. In other examples, the values in the LUT are determined by a representative device (e.g., during a characterization procedure in a manufacturing process) and loaded into a memory (e.g., the memory 298) of the device which performs the comparison in block 1108, which is a different device than the representative device.

In block 1110, based on the comparing in block 1108, a use state of the communication device may be determined. For example, it may be determined that the communication device is in a free space use state, or another use state.

In block 1112, based on the use state determined in block 1110, a device parameter of the communication device may be adjusted. For example, based on a use state of, for example, US4 (FIG. 10D), where the communication device 300 is determined to be in the user's right hand and near the user's head, the transmit power allowed to be provided by antenna 322 (Ant0) may be limited to 21 dBm, the transmit power allowed to be provided by antenna 324 (Ant1) may be limited to 20 dBm, the transmit power allowed to be provided by antenna 326 (Ant2) may be limited to 22 dBm, and the transmit power allowed to be provided by antenna 328 (Ant1) may be limited to 20 dBm. In other examples, the transmit powers are not determined based on a table, as described with respect to FIG. 10D, but rather are determined by an exposure manager based on the use state and past transmit powers and/or exposures.

In block 1114 it is determined whether the cellular connection should be ended. If the cellular connection is not ended, then the process returns to block 1104. If the cellular connection should be ended, then in block 1116 the cellular connection is ended and the process ends. While FIG. 11 describes sending a unique signal and determining a use state while the device is on a call for a licensed communication, such operation is not required. For example, a use state may be determined based on transmitting a unique signal over an unlicensed band, and that use state may thereafter be used to determine operating or device parameters for communications on a licensed band in a subsequent call on the licensed band.

The LUT table can comprise other device parameters such as WAN Tx antenna selection or tuning, and based on the use state determination, the appropriated Tx antenna selection or tuning can be performed.

Figure 12:
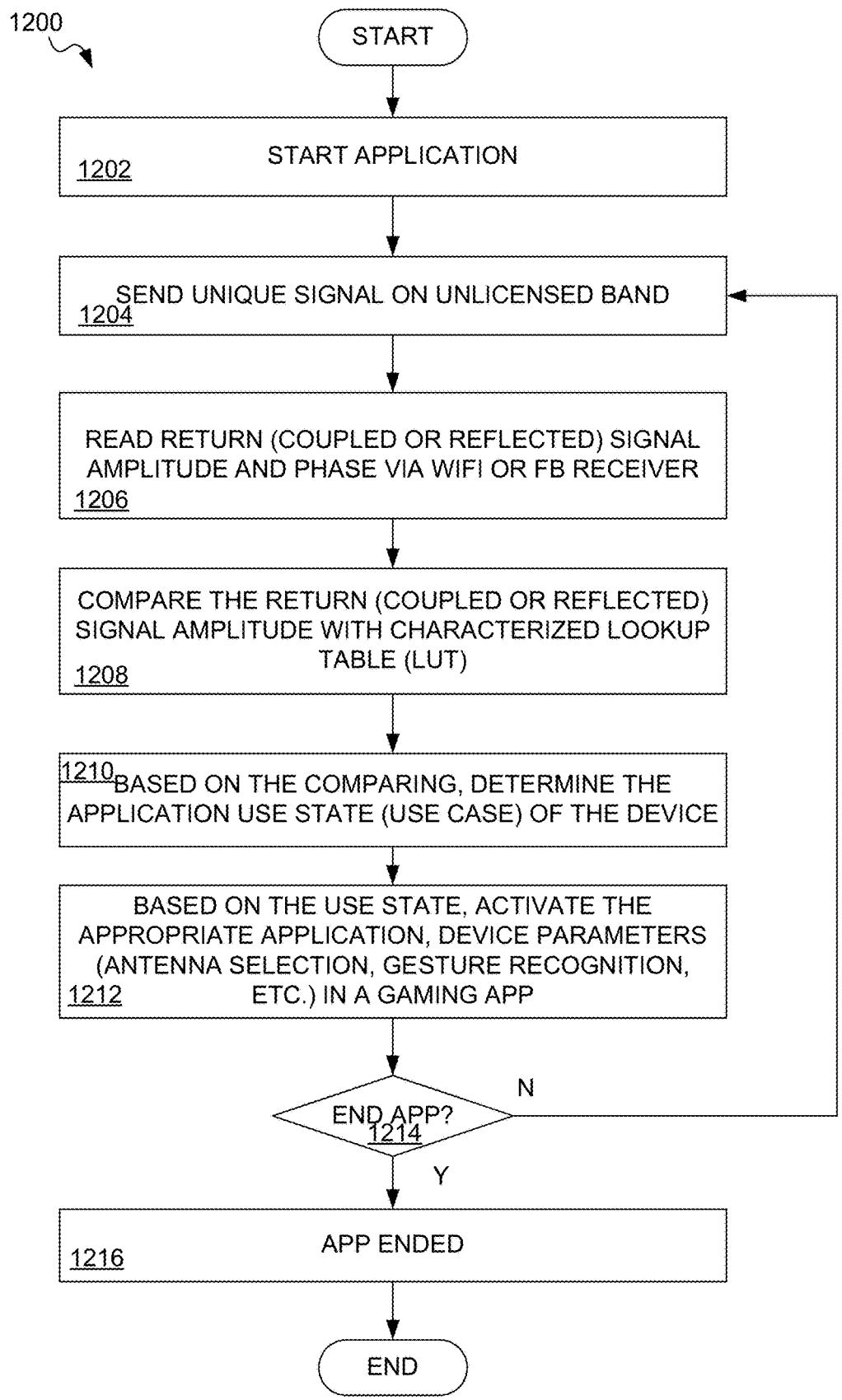
FIG. 12 is a flow chart describing an example of the operation of a method for altering an operating parameter of a device.

FIG. 12 is a flow chart describing an example of the operation of a method 1200 for altering an operating device parameter (e.g., maximum transmit power control, antenna selection, gesture and object detection) of a device. The blocks in the method 1200 can be performed in or out of the order shown, and in some embodiments, can be performed at least in part in parallel.

In block 1202, an application is started on a device. For example, any of the communication devices 400, 500, 600, 700 and 800 described herein may start an application.

In block 1204, a communication device sends a unique signal on an unlicensed frequency band, such as a pilot signal. For example, the communication device 400 may send a pilot signal using the Tx modulator 406 to generate a pilot signal that is transmitted by the transmit amplifier 442 over antenna 324 (Ant1). In an exemplary embodiment, because the pilot signal is being sent over an unlicensed frequency band, there are fewer, if any, timing and power requirements that dictate the conditions under which the unlicensed pilot signal may be sent. The unlicensed pilot signal may be sent periodically according to a schedule, or may be sent on demand. In some examples, the application may communicate with a system or sub-system for unlicensed communication in the device to determine when to send the pilot signals. In some examples, use state detection may be performed more often or at more opportune times, and/or increased transmit power of the unique transmit signal may allow for greater resolution or distance at which objects or gestures may be detected as compared to operation of known devices.

In block 1206, a return signal responsive to the unlicensed unique signal transmitted in block 1204, such as a return (reflected or coupled) signal, may be received and analyzed by unlicensed receiver circuitry, such as a WiFi receiver or a feedback receiver, to determine, for example, amplitude and phase (td). For example, one or more return signals may be provided to the receive mixers 430, 432 and/or 434 of FIG. 4A, or a return signal comprising a coupled signal or a reflected signal may be provided to a feedback receiver 564 (FIG. 5A), 664 (FIG. 6A) and 764 (FIG. 7A).

In block 1208, an amplitude and phase (td) of the return signal may be compared against amplitude and phase (td) values that may correspond to prior characterized use states (for example, for maximum transmit power control, antenna selection, gesture or object detection use case or other use case of the device) that may be stored in a look up table (LUT) to determine a current use state (or use case) of the communication device. The device performing this comparison may be the same device that was used to fill in (or edit) the values in the LUT, or may be a different device. For example, a device may input the values in the LUT or refine them over time based on measurements taken during use of the device. In other examples, the values in the LUT are determined by a representative device (e.g., during a characterization procedure in a manufacturing process) and loaded into a memory (e.g., the memory 298) of the device which performs the comparison in block 1208, which is a different device than the representative device.

In block 1210, based on the comparing in block 1208, a use state (or use case) of the communication device may be determined. For example, it may be determined that the communication device is in a free space use state (or use case), or another use state.

In block 1212, based on the use state (or use case) determined in block 1210, a device parameter of the communication device may be adjusted or an appropriate application function may be activated. For example, based on a use case the application may configure a gaming controller's device parameters (e.g., antenna selection, gesture or object detection, etc.).

In block 1214 it is determined whether the application should be ended. If the application is not ended, then the process returns to block 1204. If the application should be ended, then in block 1216 the application is ended and the process ends. While FIG. 12 describes sending a unique signal and determining a use state while an application is running on the device, such operation is not required. For example, a use state may be determined based on transmitting a unique signal over an unlicensed band, and that use state may thereafter be used to determine operating or device parameters for application operation in a subsequently started application.

Figure 13:
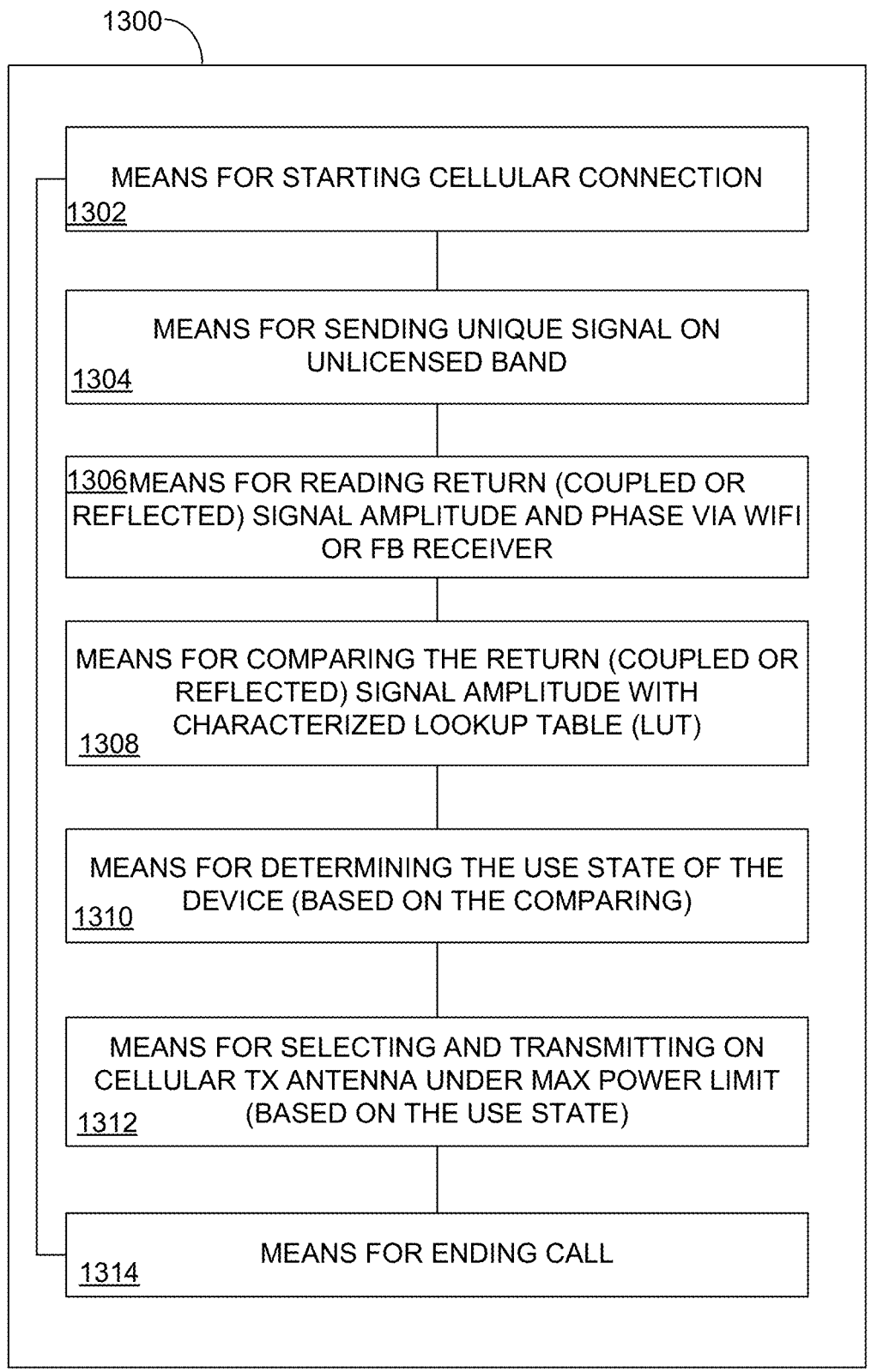
FIG. 13 is a functional block diagram of an apparatus for altering an operating parameter of a device.

FIG. 13 is a functional block diagram of an apparatus for altering an operating device parameter.

The apparatus 1300 comprises means for starting a cellular connection. In certain embodiments, the means 1302 for starting a cellular connection can be configured to perform one or more of the functions described in operation block 1102 of method 1100 (FIG. 11). In an exemplary embodiment, the means 1302 for starting a cellular connection may comprise any of the communication devices 400, 500, 600, 700 and 800 configured to establish a cellular communication connection (or a portion of such device, such as a modem), or another connection using circuitry that operates on a licensed frequency band.

The apparatus 1300 may also comprise means 1304 for sending a unique signal on an unlicensed frequency band. In certain embodiments, the means 1304 for sending a unique signal on an unlicensed frequency band can be configured to perform one or more of the functions described in operation block 1104 of method 1100 (FIG. 11). In an exemplary embodiment, the means 1304 for sending a unique signal on an unlicensed frequency band may comprise the Tx modulator 406 configured to generate a pilot signal and the transmit amplifier 442 configured to transmit the pilot signal over antenna 324 (Ant1).

The apparatus 1300 may also comprise means 1306 for reading a return signal. In certain embodiments, the means 1306 for reading a return signal can be configured to perform one or more of the functions described in operation block 1106 of method 1100 (FIG. 11). In an exemplary embodiment, the means 1306 for reading a return signal may comprise circuitry configured to read and analyze a return signal responsive to the unlicensed unique signal transmitted in block 1304, such as a reflected or coupled signal by unlicensed receiver circuitry, such as a WiFi receiver or a feedback receiver, to determine, for example, amplitude and phase (td).

The apparatus 1300 may also comprise means 1308 for comparing the read return signal. In certain embodiments, the means 1308 for comparing the read return signal can be configured to perform one or more of the functions described in operation block 1108 of method 1100 (FIG. 11). In an exemplary embodiment, the means 1308 for comparing the read return signal may comprise circuitry configured to compare an amplitude and phase (td) of the return signal against amplitude and phase (td) values that may correspond to prior characterized use states that may be stored in a look up table (LUT) to determine a current use state of the communication device.

The apparatus 1300 may also comprise means 1310 for determining a use state of the device. In certain embodiments, the means 1310 for determining a use state of the device can be configured to perform one or more of the functions described in operation block 1110 of method 1100 (FIG. 11). In an exemplary embodiment, the means 1310 for determining a use state of the device may comprise circuitry configured, based on the comparing in block 1308, to determine a use state of the communication device. For example, it may be determined that the communication device is in a free space use state, or another use state. The means 1308 and/or 1310 may comprise a Rx/RF detection and sensing element.

The apparatus 1300 may also comprise means 1312 for selecting and transmitting on a cellular antenna. In certain embodiments, the means 1312 for selecting and transmitting on a cellular antenna can be configured to perform one or more of the functions described in operation block 1112 of method 1100 (FIG. 11). In an exemplary embodiment, the means 1312 for selecting and transmitting on a cellular antenna may comprise circuitry configured, based on the use state determined in block 1310, to adjust a device parameter of the communication device. For example, based on a use state of, for example, US4 (FIG. 10D), where the communication device 300 is determined to be in the user's right hand and next to the user's head, the transmit power allowed to be provided by antenna 322 (Ant0) may be limited to 21 dBm, the transmit power allowed to be provided by antenna 324 (Ant1) may be limited to 20 dBm, the transmit power allowed to be provided by antenna 326 (Ant2) may be limited to 22 dBm, and the transmit power allowed to be provided by antenna 328 (Ant1) may be limited to 20 dBm. Such means may comprise a modem (shared between the licensed and unlicensed circuitry or separate for cellular connections), the data processor 210, an RF exposure manager (which may be implemented in a modem or elsewhere), etc.

The apparatus 1300 may also comprise means 1314 for ending a call. In certain embodiments, the means 1314 for ending a call can be configured to perform one or more of the functions described in operation block 1116 of method 1100 (FIG. 11). In an exemplary embodiment, the means 1314 for ending a call may comprise circuitry (e.g., a modem) configured to end the call on the communication device.

Figure 14:
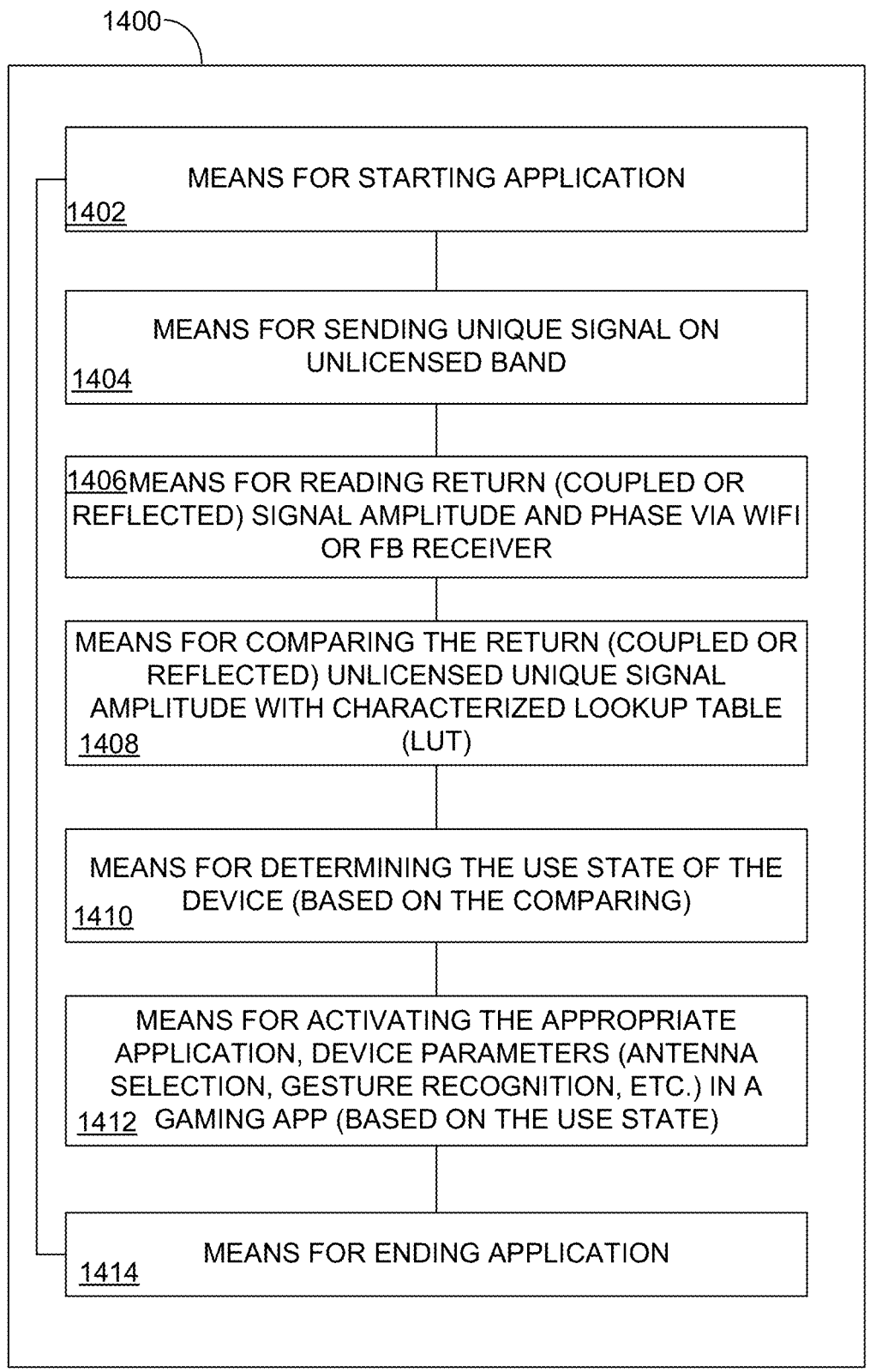
FIG. 14 is a functional block diagram of an apparatus for altering an operating parameter of a device.

FIG. 14 is a functional block diagram of an apparatus for altering an operating device parameter. The apparatus 1400 comprises means for starting an application (app). In certain embodiments, the means 1402 for starting an application can be configured to perform one or more of the functions described in operation block 1202 of method 1200 (FIG. 12). In an exemplary embodiment, the means 1402 for starting an application may comprise any of the communication devices 400, 500, 600, 700 and 800 configured to start an application (or a portion of such device, such as an apps processor).

The apparatus 1400 may also comprise means 1404 for sending a unique signal on an unlicensed frequency band. In certain embodiments, the means 1404 for sending a unique signal on an unlicensed frequency band can be configured to perform one or more of the functions described in operation block 1204 of method 1200 (FIG. 12). In an exemplary embodiment, the means 1404 for sending a unique signal on an unlicensed frequency band may comprise the Tx modulator 406 configured to generate a pilot signal and the transmit amplifier 442 configured to transmit the pilot signal over antenna 324 (Ant1).

The apparatus 1400 may also comprise means 1406 for reading a return signal. In certain embodiments, the means 1406 for reading a return signal can be configured to perform one or more of the functions described in operation block 1206 of method 1200 (FIG. 12). In an exemplary embodiment, the means 1406 for reading a return signal may comprise circuitry configured to read and analyze a return signal responsive to the unlicensed unique signal transmitted in block 1404, such as a reflected or coupled signal by unlicensed receiver circuitry, such as a WiFi receiver or a feedback receiver, to determine, for example, amplitude and phase (td).

The apparatus 1400 may also comprise means 1408 for comparing the read return signal. In certain embodiments, the means 1408 for comparing the read return signal can be configured to perform one or more of the functions described in operation block 1208 of method 1200 (FIG. 12). In an exemplary embodiment, the means 1408 for comparing the read return signal may comprise circuitry configured to compare an amplitude and phase (td) of the return signal against amplitude and phase (td) values that may correspond to prior characterized use states (e.g., maximum transmit power control, antenna selection, gesture or object detection use case or other use case of the device) that may be stored in a look up table (LUT) to determine a current use state of the communication device.

The apparatus 1400 may also comprise means 1410 for determining a use state of the device. In certain embodiments, the means 1410 for determining a use state of the device can be configured to perform one or more of the functions described in operation block 1210 of method 1200 (FIG. 12). In an exemplary embodiment, the means 1410 for determining a use state of the device may comprise circuitry configured, based on the comparing in block 1408, to determine a use state of the communication device. For example, it may be determined that the communication device is in a free space use state, or another use state. The means 1408 and/or 1410 may comprise a Rx/RF detection and sensing element.

The apparatus 1400 may also comprise means 1412 for activating appropriate application device parameters. In certain embodiments, the means 1412 for activating appropriate application device parameters can be configured to perform one or more of the functions described in operation block 1212 of method 1200 (FIG. 12). In an exemplary embodiment, the means 1412*f* for activating appropriate application device parameters may comprise circuitry (e.g., an apps processor) configured, based on the use state determined in block 1410, to adjust a device parameter of the communication device or activate an appropriate application function. For example, based on a use case where the application is configuring a gaming controller's device parameters (e.g., maximum transmit power control, antenna selection, gesture or object detection, etc.).

The apparatus 1400 may also comprise means 1414 for ending an application. In certain embodiments, the means 1414 for ending a n application can be configured to perform one or more of the functions described in operation block 1216 of method 1200 (FIG. 12). In an exemplary embodiment, the means 1414 for ending an application may comprise circuitry (e.g., an apps processor) configured to end the application on the device.

Implementation examples are described in the following numbered clauses:

1. A device for RF sensing, comprising communication circuitry configured to communicate over an unlicensed frequency band and a licensed frequency band, the communication circuitry having: a transmit (Tx) modulator, at least one transmitter, at least one receiver, a receive sensing element, and one or more antennas; the communication circuitry configured to transmit a unique signal over the unlicensed frequency band using at least one antenna of the one or more antennas and receive a corresponding return signal from at least one antenna of the one or more antennas, the at least one receiver configured to process the corresponding return signal to determine at least an amplitude and phase (td) of the corresponding return signal; and a look up table (LUT) having characterization information relating to the amplitude and phase (td) of the corresponding return signal, wherein the device is configured to use the characterization information to determine a use state or a gesture of the device and alter at least one operating parameter of the device based on the determined use state or gesture.
2. The device of clause 1, wherein the corresponding return signal is a coupled signal.
3. The device of clause 1, wherein the corresponding return signal is a reflected signal.
4. The device of clause 1, wherein the transmitter is a WiFi, Bluetooth, or NR-U transmitter.
5. The device of clause 1, wherein the receiver is a WiFi, Bluetooth, or 5G NR-U receiver.
6. The device of any of clauses 1 through 5, wherein the receiver is a feedback receiver.
7. The device of any of clauses 1 through 6, wherein the device is a communication device.
8. The device of any of clauses 1 through 7, wherein altering the operating parameter of the device comprises altering an operating parameter associated with the communication circuitry configured to communicate over one or more licensed frequency bands.
9. The device of clause 8, wherein the operating parameter includes a maximum transmit power or an antenna tuning.
10. The device of any of clauses 1 through 9, further comprising using sensors selected from gyroscopic, accelerometer and camera to change selected operating parameters.
11. A method for RF sensing to determine device parameters, comprising: transmitting from a device a unique signal on an unlicensed frequency band; receiving a return signal at the device responsive to the unique signal; determining an amplitude and phase (td) of the return signal; comparing the determined amplitude and phase (td) of the return signal to a known set of amplitudes and phases corresponding to one or more device characterization profiles; based on the comparing, determining a use state of the device; and based on the determined use state, altering a device parameter of the device.
12. The method of clause 11, wherein the return signal is a coupled signal.
13. The method of clause 11, wherein the return signal is a reflected signal.
14. The method of clause 11, wherein altering the device parameter of the device comprises altering a device parameter associated with communication circuitry configured to communicate over one or more licensed frequency bands.
15. The method of clause 14, wherein the device parameter includes a maximum transmit power or an antenna tuning.
16. A device, comprising: means for transmitting a unique signal on an unlicensed frequency band; means for receiving a return signal responsive to the unique signal; means for determining an amplitude and phase (td) of the return signal; means for comparing the determined amplitude and phase (td) of the return signal to a known set of amplitudes and phases corresponding to one or more device characterization profiles; means for determining, based on the comparing, a use state of the device; and means for altering, based on the determined use state, an operating parameter of the device.
17. The device of clause 16, wherein the return signal is a coupled signal.
18. The device of clause 16, wherein the return signal is a reflected signal.
19. The device of clause 16, wherein the means for altering the operating parameter of the device comprises altering an operating parameter associated with communication circuitry configured to communicate over one or more licensed frequency bands.
20. The device of clause 19, wherein the device parameter includes a maximum transmit power or an antenna tuning.
21. A device, comprising: communication circuitry configured to send and receive communications on a licensed frequency band; transmission circuitry configured to send a sensing signal on an unlicensed frequency band while the device is in a call for the licensed frequency band, the transmission circuitry configured to send the sensing signal using a power higher than allowed for the communication circuitry during the call; receive circuitry configured to process a receive signal based on the sensing signal during the call; and a processor configured to adjust an operating parameter of the device based on the processed receive signal.
22. The device of clause 21, wherein the receive signal is a coupled signal.

23. The device of clause 21, wherein the receive signal is a reflected signal.

24. The device of any of clauses 21 through 23, wherein the device comprises a plurality of antennas, wherein the plurality of antennas are each configured to receive a reflected version of the sensing signal, wherein the receive circuitry is configured to process the versions of the reflected signal from the plurality of antennas, and wherein the processor is configured to adjust the operating parameter based on the processed versions of the reflected signal.

25. The device of any of clauses 21 through 24, wherein the receive circuitry comprises a feedback receiver configured for operation with a subsystem for communications over the unlicensed frequency band.

26. The device of any of clauses 21 through 25, wherein the communication circuitry is configured to send and receive subsequent communications on the licensed frequency band using the adjusted operating parameter.

27. The device of any of clauses 21 through 26, wherein the sensing signal complies with a communications standard for communicating over the unlicensed frequency band.

28. The device of any of clauses 21 through 27, wherein the operating parameter includes a maximum transmit power or an antenna tuning.

29. The device of any of clauses 21 through 28, wherein the processor is configured to sense a gesture based on the processed receive signal and to adjust the operating parameter based on the sensed gesture.

30. The device of any of clauses 21 through 29, further comprising using sensors selected from gyroscopic, accelerometer and camera to change selected operating parameters.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A device for RF sensing, comprising:
    communication circuitry configured to communicate over an unlicensed frequency band and a licensed frequency band, the communication circuitry having:
        a transmit (Tx) modulator, at least one transmitter, at least one receiver,
        a receive sensing element, and one or more antennas;
    the communication circuitry configured to transmit a unique signal over the unlicensed frequency band using a first antenna of the one or more antennas at a power level higher than a power level that the communication circuitry transmits a communication signal on a licensed frequency band and receive a corresponding return signal from a second antenna of the one or more antennas, the at least one receiver configured to process the corresponding return signal to determine at least an amplitude and phase (td) of the corresponding return signal; and
    a look up table (LUT) having characterization information relating to the amplitude and phase (td) of the corresponding return signal, wherein the device is configured to use the characterization information to determine a use state or a gesture of the device and alter at least one operating parameter of the device based on the determined use state or gesture.

2. The device of claim 1, wherein the corresponding return signal is a coupled signal.

3. The device of claim 1, wherein the corresponding return signal is a signal reflected from an object.

4. The device of claim 1, wherein the transmitter is a WiFi, Bluetooth, or 5G NR-U transmitter.

5. The device of claim 1, wherein the receiver is a WiFi, Bluetooth, or 5G NR-U receiver.

6. The device of claim 1, wherein the receiver is a feedback receiver.

7. The device of claim 1, wherein the device is a communication device.

8. The device of claim 1, wherein altering the operating parameter of the device comprises altering an operating parameter associated with the communication circuitry configured to communicate over one or more licensed frequency bands.

9. The device of claim 8, wherein the operating parameter includes a maximum transmit power or an antenna tuning.

10. The device of claim 1, further comprising using sensors selected from gyroscopic, accelerometer and camera to change selected operating parameters.

11. A method for RF sensing to determine device parameters, comprising:
    transmitting from a first antenna of a device a unique signal on an unlicensed frequency band at a power level higher than a power level that communication circuitry transmits a communication signal on a licensed frequency band;
    receiving a return signal at a second antenna at the device responsive to the unique signal;
    determining an amplitude and phase (td) of the return signal;
    comparing the determined amplitude and phase (td) of the return signal to a known set of amplitudes and phases corresponding to one or more device characterization profiles;
    based on the comparing, determining a use state of the device; and
    based on the determined use state, altering a device parameter of the device.

12. The method of claim 11, wherein the return signal is a coupled signal.

13. The method of claim 11, wherein the return signal is a signal reflected from an object.

14. The method of claim 11, wherein altering the device parameter of the device comprises altering a device parameter associated with communication circuitry configured to communicate over one or more licensed frequency bands.

15. The method of claim 14, wherein the device parameter includes a maximum transmit power or an antenna tuning.

16. A device, comprising:
- means for transmitting from first antenna means a unique signal on an unlicensed frequency band at a power level higher than a power level that communication circuitry transmits a communication signal on a licensed frequency band;
- means for receiving a return signal at a second antenna means responsive to the unique signal;
- means for determining an amplitude and phase (td) of the return signal;
- means for comparing the determined amplitude and phase (td) of the return signal to a known set of amplitudes and phases corresponding to one or more device characterization profiles;
- means for determining, based on the comparing, a use state of the device; and
- means for altering, based on the determined use state, an operating parameter of the device.

17. The device of claim 16, wherein the return signal is a coupled signal.

18. The device of claim 16, wherein the return signal is a signal reflected from an object.

19. The device of claim 16, wherein the means for altering the operating parameter of the device comprises altering an operating parameter associated with communication circuitry configured to communicate over one or more licensed frequency bands.

20. The device of claim 19, wherein the device parameter includes a maximum transmit power or an antenna tuning.

21. A device, comprising:
- communication circuitry configured to send and receive communications on a licensed frequency band;
- transmission circuitry configured to send a sensing signal from a first antenna of the device on an unlicensed frequency band while the device is in a call for the licensed frequency band, the transmission circuitry configured to send the sensing signal using a power higher than a power used by the communication circuitry to send and receive signals on the licensed frequency band during the call;
- receive circuitry configured to process a receive signal received at a second antenna of the device based on the sensing signal during the call; and
- a processor configured to adjust an operating parameter of the device based on the processed receive signal.

22. The device of claim 21, wherein the receive signal is a coupled signal.

23. The device of claim 21, wherein the receive signal is a signal reflected from an object.

24. The device of claim 23, wherein the device comprises a plurality of antennas, wherein the plurality of antennas are each configured to receive a reflected version of the sensing signal, wherein the receive circuitry is configured to process the versions of the reflected signal from the plurality of antennas, and wherein the processor is configured to adjust the operating parameter based on the processed versions of the reflected signal.

25. The device of claim 21, wherein the receive circuitry comprises a feedback receiver configured for operation with a subsystem for communications over the unlicensed frequency band.

26. The device of claim 21, wherein the communication circuitry is configured to send and receive subsequent communications on the licensed frequency band using the adjusted operating parameter.

27. The device of claim 21, wherein the sensing signal complies with a communications standard for communicating over the unlicensed frequency band.

28. The device of claim 21, wherein the operating parameter includes a maximum transmit power or an antenna tuning.

29. The device of claim 21, wherein the processor is configured to sense a gesture based on the processed receive signal and to adjust the operating parameter based on the sensed gesture.

30. The device of claim 21, further comprising using sensors selected from gyroscopic, accelerometer and camera to change selected operating parameters.

* * * * *